US009784837B1

(12) United States Patent
Olsson et al.

(10) Patent No.: US 9,784,837 B1
(45) Date of Patent: Oct. 10, 2017

(54) OPTICAL GROUND TRACKING APPARATUS, SYSTEMS, AND METHODS

(71) Applicants: Mark S. Olsson, La Jolla, CA (US); Michael J. Martin, San Diego, CA (US); Sequoyah Aldridge, San Diego, CA (US); Ray Merewether, La Jolla, CA (US)

(72) Inventors: Mark S. Olsson, La Jolla, CA (US); Michael J. Martin, San Diego, CA (US); Sequoyah Aldridge, San Diego, CA (US); Ray Merewether, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 104 days.

(21) Appl. No.: 13/958,492

(22) Filed: Aug. 2, 2013

Related U.S. Application Data

(60) Provisional application No. 61/790,552, filed on Mar. 15, 2013, provisional application No. 61/679,672, filed on Aug. 3, 2012.

(51) Int. Cl.
*G01C 3/08* (2006.01)
*G01S 17/66* (2006.01)
*G01S 17/89* (2006.01)

(52) U.S. Cl.
CPC .............. *G01S 17/66* (2013.01); *G01S 17/89* (2013.01)

(58) Field of Classification Search
CPC ......... G01C 3/08; G01C 15/002; G01S 17/89; G01S 7/4817; G01S 17/42
USPC ..... 356/4.01, 4.07, 5.01, 5.09, 3.01, 3.09, 9, 356/625
See application file for complete search history.

(56) References Cited

U.S. PATENT DOCUMENTS

| 5,014,712 | A  | * | 5/1991  | O'Donnell ................... 600/447 |
|-----------|----|---|---------|----------------------------------|
| 5,241,517 | A  | * | 8/1993  | Carolan ........................ 367/127 |
| 2003/0058961 | A1 | * | 3/2003  | Fling et al. ................... 375/316 |
| 2004/0182999 | A1 | * | 9/2004  | Denney ................. B23K 26/03 250/227.14 |
| 2007/0240903 | A1 | * | 10/2007 | Alft et al. ........................ 175/50 |
| 2008/0030573 | A1 | * | 2/2008  | Ritchey ........................... 348/36 |
| 2008/0100563 | A1 | * | 5/2008  | Park ............................... 345/102 |
| 2010/0275934 | A1 | * | 11/2010 | Keren .................. G01D 5/2066 128/899 |
| 2011/0155119 | A1 | * | 6/2011  | Hickerson et al. ........... 126/574 |
| 2011/0164246 | A1 | * | 7/2011  | Riddell ............. G01N 15/1459 356/301 |
| 2011/0275408 | A1 | * | 11/2011 | Kulik ..................... G01C 17/34 455/556.1 |
| 2012/0044363 | A1 | * | 2/2012  | Lu et al. .................... 348/207.1 |
| 2012/0188416 | A1 | * | 7/2012  | Tsai et al. .................... 348/241 |

(Continued)

OTHER PUBLICATIONS

Strelow, Dennis W., "Motion Estimation from Image and Inertial Measurements," Doctoral Thesis, Nov. 2004, Carnegie Mellon University, Pittsburgh, PA.

*Primary Examiner* — Samantha K Abraham
(74) *Attorney, Agent, or Firm* — Steven C. Tietsworth, Esq.

(57) ABSTRACT

Apparatus, systems, and methods are disclosed for tracking movement over the ground or other surfaces of tools or instruments or equipment, such as buried object locators or other devices, and generating motion, position, location, mapping and/or related information for tracked locations, as well as measuring and storing associated signals and other information detected or generated during tracking.

11 Claims, 19 Drawing Sheets

(56) References Cited

U.S. PATENT DOCUMENTS

| | | | |
|---|---|---|---|
| 2012/0227263 A1* | 9/2012 | Leclair et al. | 29/868 |
| 2012/0293699 A1* | 11/2012 | Blanquart et al. | 348/296 |
| 2012/0306690 A1* | 12/2012 | Yule | G01S 5/0036 342/357.25 |
| 2013/0139437 A1* | 6/2013 | Maxik et al. | 47/58.1 LS |

* cited by examiner

One Embodiment of a Perimeter Sensor Array

Another Embodiment of a Perimeter Sensor Array

Example of Individual Sensor Element (Shown Above Disposed on Substrate)

Another Embodiment of a Perimeter Sensor Array

Another Embodiment of a Perimeter Sensor Array

Example Embodiment of Ground Tracking Apparatus

*Example Embodiment of Refractive Optical Assembly and Perimeter Optical Sensor*

*Example Embodiment of Optical Sensor Element For
Use in Perimeter Sensor Array Embodiments*

OPTICAL GROUND TRACKING APPARATUS, SYSTEMS, AND METHODS

CROSS-REFERENCE TO RELATED APPLICATIONS

This application claims priority under 35 U.S.C. §119(e) to U.S. Provisional Patent Application Ser. No. 61/790,552, filed Mar. 15, 2013, entitled OPTICAL GROUND TRACKING APPARATUS, SYSTEMS, AND METHODS, and to U.S. Provisional Patent Application Ser. No. 61/679,672, filed Aug. 3, 2012, entitled OPTICAL GROUND TRACKING APPARATUS, SYSTEMS, AND METHODS. The content of each of these applications is incorporated by reference herein in its entirety for all purposes.

FIELD

This disclosure relates generally to apparatus, systems, and methods for locating hidden or buried objects. More specifically, but not exclusively, the disclosure relates to apparatus, systems, and methods for tracking movement over the ground or other surfaces of tools or instruments or equipment, such as buried object locators or other devices, and generating motion, position, location, mapping and/or related information for tracked locations, as well as measuring and storing associated signals and other information detected or generated during tracking.

BACKGROUND

With the evolution of more complex infrastructures requiring enhancement, re-placement, and expansion in all areas of human occupation, and in particular high-density areas such as cities and suburbs, the ability to accurately map the location of buried conduits, wires and pipelines of various sizes and kinds becomes more pressing, as does the need to document actual as-built underground installations before they are covered so that they can be precisely located at a later date.

Worker safety and project economic concerns also require the location and identi-fication of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects."

The unintended destruction of power and data cables may seriously disrupt the comfort and convenience of residents and bring huge financial costs to business. Therefore human-portable buried object locators (also denoted herein for brevity as "locators") have been developed that sense electromagnetic signals to locate buried utilities such as pipes and cables. Buried objects are frequently located by utility employees or other uses by moving a locator over the ground or other surface and receiving and processing electromagnetic signals emitted from the buried objects. These operations are also known as "line tracing" or "locates." If the buried conductors carry their own electrical signal, they can be traced by detecting the emitted signals at their corresponding frequency or frequencies, such as 50 or 60 Hz or harmonics thereof for underground power cables. Signals with a known frequency may also be applied to pipes and cables via a transmitter and either directly or inductively or capacitively coupled to enhance the ease and accuracy of the line tracing. During these operations, also known as "locates," it is desirable to track the position and location of the locator or other device throughout its movement.

Portable utility locators typically carry one or more antennas that are used to detect the electromagnetic signals emitted by buried pipes and cables, and by sondes that have been inserted into pipes. The accuracy of portable utility locators is limited by the sensitivity and the configuration of their antennas. Moreover, precise locating of the position of a locator on the surface of the earth—as would be needed, for example, in order to build an accurate digital map of the locating results—has been problematic because of imprecise positioning technology and an inability to track the position of a locator relative to the ground itself.

Accordingly, there is a need in the art to address the above-described as well as other tracking related problems.

SUMMARY

This disclosure relates generally to ground tracking apparatus, systems, and methods. The apparatus, methods, and systems described herein may be used with a wide variety of tools, instruments, equipment, or other devices that move or are moved over the ground or other surfaces.

For example, in one aspect, the disclosure relates to buried object locating system which may include, for example, a buried object locator and a ground tracking apparatus which may include one or more light emitting elements, such as light-emitting diodes (LEDs), laser or other light sources, and the like. Embodiments may use light sources and ambient light alone in some embodiments and in combination in some embodiments. A plurality of color sensors may be used for capturing and filtering reflections from such types of emitted light as reflected from the ground surface.

In another aspect, disclosure relates to a method of capturing information describing light from a ground surface reflection of emitted light pulses as digital data and incorporating such data into a mapping process.

In another aspect, the disclosure relates to a method for use in a buried object locator system. The method may include, for example, generating, from a locating instrument, laser light in timed pulses whose reflections may be used by appropriate devices to compute the precise distance of the locating instrument above ground. The method may further include using such measured distance to refine the calculated depth of detected buried objects as computed by the locating instrument.

In another aspect, the disclosure relates to a locating device equipped with light-sensing and/or color-sensing arrays which, in combination with other locational sensors, such as inertial or gyroscopic sensors, may enable the device to operate as an optical ground-tracking device, capturing situational data for integration with maps and area images.

In another aspect, the disclosure relates to a locating receiver which may include a processor or processors for computing surface velocity vectors over ground of the receiver by correlation of reflected light received by a plurality of color sensors, and may also include memory devices capable of storing and relaying such information in digital form.

In another aspect, the disclosure relates to a light source that may be a coherent laser light whose reflections from a surface are detected by a sensor from whose input a pattern analysis may be used to deduce the range and motion of the instrument relative to the ground.

In another aspect, the disclosure relates to an optical ground tracking sensor assembly or apparatus. The apparatus may include, for example, an optical sensor, which may be configured as a perimeter optical sensor array having a plurality of optical sensor elements. The apparatus may further include an optics assembly for directing light from a surface area, such as an area of the ground or other surface, onto the perimeter optical sensor to generate an image of the surface area. The apparatus may further include one or more processing elements. The processing elements may be configured to receive an output signal from the perimeter optical sensor array assembly and generate, based at least in part on the received output signal, information usable to determine position information associated with the ground tracking apparatus. The output optical signal may be a digital signal representing sensed illuminance and/or color values at optical sensor elements of the optical sensor array.

The perimeter optical sensor array may be configured, for example, as an oval or circular optical sensor array. Alternately, the perimeter optical sensor array may be configured as a square or rectangular optical sensor array. The perimeter optical sensor array may alternately be configured as another shape enclosing an area of the substrate, such as a triangular shape or other shape. The perimeter optical sensor array may include a single row of optical sensor elements. The single row of optical sensor elements may be disposed substantially around a perimeter of the array or substrate area. Alternately, the perimeter optical sensor array may include two or more rows of optical sensor elements. The two or more rows may be disposed substantially concentrically around a perimeter of the array or otherwise arranged in a geometrical fashion.

One or more of the plurality of optical sensor elements of the perimeter optical sensor array may be color sensors and may provide outputs at two or more different color wavelengths or bands of color wavelengths.

The optics assembly may be, for example, a reflective optics assembly which may be configured similarly to a mirror lens or telescope lens. The reflective optics assembly may include one or more circular mirror lens assemblies. The reflective optics may include a three dimensional (3D) parabolic reflector. Alternately, the optics assembly may be configured as a refractive optics assembly. The refractive optics assembly may include a refractor lens assembly including an objective lens.

The processing element may include one or more processor or processing devices and one or more memories coupled to the processors. The processors and memories may be configured to receive and cross-correlate outputs of ones of the plurality of optical sensor elements. The cross-correlation may be performed over samples collected at the same sample time and/or at samples collected at different sample times, such as at two or more sequential sample times. Based on the cross-correlation the processing element may determine information usable to determine a position or motion of the ground tracking apparatus based at least in part on the cross-correlated outputs.

The apparatus may further include, for example, a light source or sources configured to generate a controlled light pattern on the surface. The controlled light pattern may include one or more lines or other shapes. The apparatus may further include a second light source configured to generate a second controlled light pattern on the surface. The second controlled light pattern may be a line or other shape. The output of the light source may be synchronized with a sampling time interval of the optical sensor elements. The controlled light pattern may be pulsed in synchronization with the sampling of the optical sensor elements.

The apparatus may further include, for example, an inertial sensor coupled to the processing element. The information usable to determine a position of the ground tracking apparatus may be further based in part on an output signal from the motion sensor. The motion sensor may be an accelerometer. The accelerometer may provide output information in 1 or more axes of motion, such as in three orthogonal axes of motion.

The apparatus may further include, for example, an orientation sensor coupled to the processing element. The information usable to determine a position of the ground tracking apparatus may be based in part on an output signal from the orientation sensor. The orientation sensor may be a compass sensor or other orientation sensor.

The apparatus may further include, for example, a position sensor coupled to the processing element. The information usable to determine a position of the ground tracking apparatus may be further based in part on an output signal from the position sensor. The position sensor may be a global positioning system (GPS) module or other position sensing device or modue.

The apparatus may further include, for example, an inertial sensor coupled to the processing element, an orientation sensor coupled to the processing element, and/or a position sensor coupled to the processing element. The information usable to determine a position of the ground tracking apparatus may be based in part on two or more of outputs from the inertial sensor, the orientation sensor, and the position sensor.

The apparatus may further include, for example, a distance measurement sensor coupled to the processing element. The distance measurement sensor may provide distance information from the tracking apparatus to the ground or other surface. The distance measurement sensor may be, for example, an infra-red distance measurement sensor. Alternately, the distance measurement sensor may be an acoustic distance measurement sensor or other distance measuring device or apparatus.

In another aspect, the disclosure relates to a method of tracking motion. The method may include, for example, determining, at a perimeter optical sensor array, a plurality of sample values of received illumination, providing the plurality of sample values to a processing element, performing a cross-correlating, in the processing element, of ones of the plurality of sample values against others of the plurality of sample values, and determining, in the processing element, position and/or motion information based at least in part on the cross-correlating. The method may further include storing the determined position and/or motion information in a memory. The method may further include providing the determined distance information on a display device of a coupled buried object locator or other device. The method may further include sending the determined distance information to another device or system, such as a remote database or computer system.

In another aspect, the disclosure relates to a method of tracking motion. The method may include, for example, determining, at a perimeter optical sensor array, a plurality of sample values of received illumination, providing the plurality of sample values to a processing element, determining, at the perimeter optical sensor array, another plurality of sample values of illumination received at a subsequent time, providing the another plurality of sample values of illumination to the processing element, performing across-correlating, in the processing element, of ones of the another plurality of sample values against ones of the plurality of sample values, and determining, in the processing element, position and/or motion information based at least in part on the another cross-correlating. The method may further include storing the determined additional position and/or motion information in a memory. The method may further include providing the determined distance information on a display device of a coupled buried object locator or other device. The method may further include sending the determined distance information to another device or system, such as a remote database or computer system.

In another aspect, the disclosure relates to a perimeter optical sensor array device. The device may include, for example, a substrate and a plurality of optical sensor elements disposed on or within a perimeter of the substrate.

In another aspect, the disclosure relates to a buried object locator including a ground or surface tracking apparatus. The locator may include, for example, a buried object locator module configured to sense a buried object and generate buried object information corresponding with the buried object. The surface tracking module may include one or more sensor arrays which may be configured to detect light reflected from a tracked surface, such as the ground or other surface. The module may include a processing module which may be configured to determine or compute a motion of the buried object locator relative to the tracked surface, based at least in part on a correlation analysis of light patterns associated with the surface. The surface tracking module may be further configured to generate motion information corresponding with the sensed motion. The locator may further include an integration module configured to associate the buried object information with corresponding motion information and store the associated information in a memory.

In another aspect, the disclosure relates to a method of tracking movement of a device over a surface. The method may include, for example, generating an output light, providing the output light to the surface, receiving reflected output light at a perimeter optical sensor array, and generating information associated with the device movement in a processing element based at least in part on the received reflected light.

In another aspect, the disclosure relates to means for implementing the above-described methods and/or system or device functions, in whole or in part.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Figure 1A:
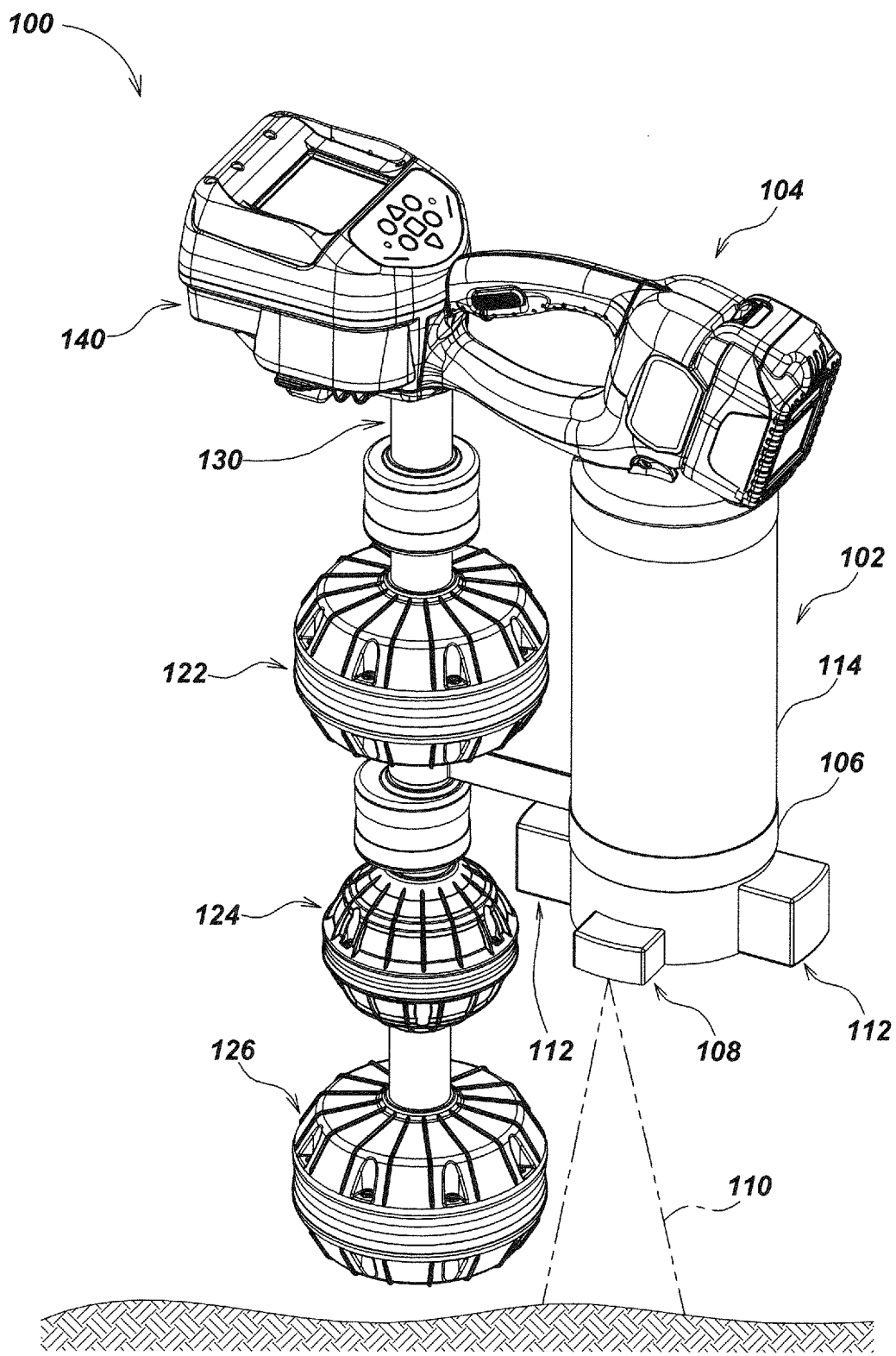
FIG. 1A is an isometric view of an embodiment of a locator with an optical ground-tracking attachment.

This application is related to co-assigned United States Provisional Patent Application Ser. No. 61/598,312, filed on Feb. 13, 2012, entitled OPTICAL GROUND TRACKING LOCATOR DEVICES AND METHODS, and to U.S. Provisional Patent Application Ser. No. 61/619,327, filed on Apr. 2, 2012, entitled OPTICAL GROUND TRACKING APPARATUS, SYSTEMS AND METHODS. In addition, the various aspects and details described herein may be used in combination with the disclosures of the following co-assigned patent applications in various buried object locator device and/or related device or system embodiments. These co-assigned applications include U.S. patent application Ser. No. 10/268,641, entitled OMNIDIRECTIONAL SONDE AND LINE LOCATOR, filed on Oct. 9, 2002, U.S. patent application Ser. No. 11/970,818, entitled MULTI-SENSOR MAPPING OMNIDIRECTIONAL SONDE AND LINE LOCATORS, filed on Jan. 8, 2008, U.S. patent application Ser. No. 12/016,870, entitled RECONFIGURABLE PORTABLE LOCATOR EMPLOYING MULTIPLE SENSOR ARRAY HAVING FLEXIBLE NESTED ORTHOGONAL ANTENNAS, filed Jan. 18, 2008, U.S. patent application Ser. No. 11/077,947, U.S. Patent Application 61/485,078, entitled LOCATOR ANTENNA CONFIGURATION, filed on May 11, 2011, and U.S. patent application Ser. No. 13/469,024, entitled BURIED OBJECT LOCATOR APPARATUS AND SYSTEMS, filed May 10, 2012. The content of each of the above-described applications is hereby incorporated by reference herein in its entirety. The above applications may be collectively denoted herein as the "co-assigned applications" or "incorporated applications."

The present disclosure relates generally to apparatus, systems, and methods for locating hidden or buried objects and tracking location and/or movement during location or other operations. More specifically, but not exclusively, the disclosure relates to buried object locating receivers and processing devices for receiving signals generated from the buried or hidden objects and processing the signals to generate information for user output and/or storage, along with tracking apparatus and methods for tracking position and/or movement over the ground or other surface, and mapping apparatus and methods for generating mapping information associated with the tracking and locator signals.

As used herein, the term "buried objects" includes objects located inside walls, between floors in multi-story buildings or cast into concrete slabs, for example, as well as objects disposed below the surface of the ground. In a typical application a buried object is a pipe, cable, conduit, wire, or other object buried under the ground surface, at a depth of from a few centimeters to meters or more, that a user, such as a utility company, construction company, homeowner, or others want to locate, map (e.g., by surface position as defined by lat/lon or other surface coordinates, and/or also by depth), and/or provide a surface mark of using paint.

When locating hidden or buried objects or using other devices that are moving or moved over the ground or other surfaces, an operator may be able to store and map detections made during a locate or other operation to provide efficient operation. Thus, locating devices or other devices capable of coordinating GPS signals or local terrain characteristics with the signals received from buried objects allow operators to more precisely fix the location of those objects on maps or overlaid onto bird's-eye or satellite images, for example, and to more readily recover the history of past locates in a given location. Precisely fixing the physical location of a locator device at as given moment in time can depend on GPS or wireless signals, the inputs from onboard inertial sensors, and the recording of ground characteristics and terrain features in the immediate vicinity by means of cameras or other optical devices. However, GPS devices have coverage gaps and can be affected by signal attenuation, interference, and propagation effects such as multipath. Therefore, signals are not always reliable or available to measure motion and track position or location. In addition, other devices, such as inertial navigation devices such as accelerometers, are subject to drift and other distortions. As described herein, additional tracking data and information may be obtained by optical sensing techniques as described herein, and these may be combined with GPS, inertial, wireless, or other location or position-determining mechanisms to improve locator device performance, increase efficiency, and/or provide additional data or information for mapping or other applications.

For example, in one aspect, the present disclosure relates to a utility locating device and associated optical tracking apparatus for tracking location over the ground while locating and capturing optical characteristics of the ground surface (such as brightness/illuminance, color, texture, and/or other surface features) as data for use in integrating the locator's electromagnetic detections with terrestrial mapping satellite images, blueprints, photographs, and/or other data or information.

In another aspect, a locator and associated tracking apparatus may be configured to detect the variable reflectivity or coloration of ground surface, including markings laid on the ground and/or projected onto it, and occasional encountered objects lying on the ground. To accomplish this, a highly directional LED light source and/or a laser light source may be optionally combined with a near-range light or color sensor array. A laser light source may be coupled to a diffraction grating or other imaging mechanism to generate lines or other shapes on the ground which may then be optically sensed and processed to determine information such as motion, height above the ground, tilt, and the like. One or more laser light sources may be used to provide a contrasting reflection which may be analyzed to provide a high-precision calculation of height above ground, orientation and/or movement over ground of the locator.

In another aspect, the disclosure relates to a buried object locating receiver with a ground tracking apparatus. The receiver may, for example, be equipped with sensors designed to receive reflected light from a ground surface over which the locator receiver is held and may be equipped with analog-to-digital circuitry enabling the values of received light to be stored as digital data. The receiver may also be equipped with distance measurement sensors designed to emit light at known frequencies and sense reflections of such light from a ground surface and further to calculate the distance of the sensor from the reflecting surface. In another aspect, parabolic or spherical mirrors and lenses may be used to focus reflected light toward light sensors, or refractive optical elements may be similarly used. A processing element may be included to process received data by performing correlations and/or other signal processing functions on received optical sensor data.

In another aspect, the receiver may be equipped with a controlled light source, such as a laser emitter or other light output device, along with a detector which receives reflections of the emitted coherent light from a ground surface. The pattern of the reflections of coherent light may be analyzed in a processing element to determine the direction and velocity of movement relative to the ground surface.

In one aspect the disclosure relates to an optical ground tracking sensor assembly or apparatus. The apparatus may include, for example, an optical sensor, which may be configured as a perimeter optical sensor array having a plurality of optical sensor elements. The apparatus may further include an optics assembly for directing light from a surface area, such as an area of the ground or other surface, onto the perimeter optical sensor to generate an image of the surface area. The apparatus may further include one or more processing elements. The processing elements may be configured to receive an output signal from the perimeter optical sensor array assembly and generate, based at least in part on the received output signal, information usable to determine position information associated with the ground tracking apparatus. The output optical signal may be a digital signal representing sensed illuminance and/or color values at optical sensor elements of the optical sensor array.

The perimeter optical sensor array may be configured, for example, as an oval or circular optical sensor array. Alternately, the perimeter optical sensor array may be configured as a square or rectangular optical sensor array. The perimeter optical sensor array may alternately be configured as another shape enclosing an area of the substrate, such as a triangular shape or other shape. The perimeter optical sensor array may include a single row of optical sensor elements. The single row of optical sensor elements may be disposed substantially around a perimeter of the array or substrate area. Alternately, the perimeter optical sensor array may include two or more rows of optical sensor elements. The two or more rows may be disposed substantially concentrically around a perimeter of the array or otherwise arranged in a geometrical fashion.

One or more of the plurality of optical sensor elements of the perimeter optical sensor array may be color sensors and may provide outputs at two or more different color wavelengths or bands of color wavelengths.

The optics assembly may be, for example, a reflective optics assembly which may be configured similarly to a mirror lens or telescope lens. The reflective optics assembly may include one or more circular mirror lens assemblies. The reflective optics may include a three dimensional (3D) parabolic reflector. Alternately, the optics assembly may be configured as a refractive optics assembly. The refractive optics assembly may include a refractor lens assembly including an objective lens.

The processing element may include one or more processor or processing devices and one or more memories coupled to the processors. The processors and memories may be configured to receive and cross-correlate outputs of ones of the plurality of optical sensor elements. The cross-correlation may be performed over samples collected at the same sample time and/or at samples collected at different sample times, such as at two or more sequential sample times. Based on the cross-correlation the processing element may determine information usable to determine a position or motion of the ground tracking apparatus based at least in part on the cross-correlated outputs.

The apparatus may further include, for example, a light source or sources configured to generate a controlled light pattern on the surface. The controlled light pattern may include one or more lines or other shapes. The apparatus may further include a second light source configured to generate a second controlled light pattern on the surface. The second controlled light pattern may be a line or other shape. The output of the light source may be synchronized with a sampling time interval of the optical sensor elements. The controlled light pattern may be pulsed in synchronization with the sampling of the optical sensor elements.

The apparatus may further include, for example, an inertial sensor coupled to the processing element. The information usable to determine a position of the ground tracking apparatus may be further based in part on an output signal from the motion sensor. The motion sensor may be an accelerometer. The accelerometer may provide output information in 1 or more axes of motion, such as in three orthogonal axes of motion.

The apparatus may further include, for example, an orientation sensor coupled to the processing element. The information usable to determine a position of the ground tracking apparatus may be based in part on an output signal from the orientation sensor. The orientation sensor may be a compass sensor or other orientation sensor.

The apparatus may further include, for example, a position sensor coupled to the processing element. The information usable to determine a position of the ground tracking apparatus may be further based in part on an output signal from the position sensor. The position sensor may be a global positioning system (GPS) module or other position sensing device or modue.

The apparatus may further include, for example, an inertial sensor coupled to the processing element, an orientation sensor coupled to the processing element, and/or a position sensor coupled to the processing element. The information usable to determine a position of the ground tracking apparatus may be based in part on two or more of outputs from the inertial sensor, the orientation sensor, and the position sensor.

The apparatus may further include, for example, a distance measurement sensor coupled to the processing element. The distance measurement sensor may provide distance information from the tracking apparatus to the ground or other surface. The distance measurement sensor may be, for example, an infra-red distance measurement sensor. Alternately, the distance measurement sensor may be an acoustic distance measurement sensor or other distance measuring device or apparatus.

In another aspect, the disclosure relates to a method of tracking motion. The method may include, for example, determining, at a perimeter optical sensor array, a plurality of sample values of received illumination, providing the plurality of sample values to a processing element, performing a cross-correlating, in the processing element, of ones of the plurality of sample values against others of the plurality of sample values, and determining, in the processing element, position and/or motion information based at least in part on the cross-correlating. The method may further include storing the determined position and/or motion information in a memory. The method may further include providing the determined distance information on a display device of a coupled buried object locator or other device. The method may further include sending the determined distance information to another device or system, such as a remote database or computer system.

The method may further include, for example, determining, at the perimeter optical sensor array, another plurality of sample values of illumination received at a subsequent time, providing the another plurality of sample values of illumination to the processing element, performing another cross-correlating, in the processing element, of ones of the another plurality of sample values against ones of the plurality of sample values, and determining, in the processing element, additional position and/or motion information based at least in part on the another cross-correlating. The method may further include storing the determined additional position and/or motion information in a memory. The method may further include providing the determined distance information on a display device of a coupled buried object locator or other device. The method may further include sending the determined distance information to another device or system, such as a remote database or computer system.

In another aspect, the disclosure relates to a method of tracking motion. The method may include, for example, determining, at a perimeter optical sensor array, a plurality of sample values of received illumination, providing the plurality of sample values to a processing element, determining, at the perimeter optical sensor array, another plurality of sample values of illumination received at a subsequent time, providing the another plurality of sample values of illumination to the processing element, performing across-correlating, in the processing element, of ones of the another plurality of sample values against ones of the plurality of sample values, and determining, in the processing element, position and/or motion information based at least in part on the another cross-correlating. The method may further include storing the determined additional position and/or motion information in a memory. The method may further include providing the determined distance information on a display device of a coupled buried object locator or other device. The method may further include sending the determined distance information to another device or system, such as a remote database or computer system.

In another aspect, the disclosure relates to a perimeter optical sensor array device. The device may include, for example, a substrate and a plurality of optical sensor elements disposed on or within a perimeter of the substrate.

The optical sensor elements may be disposed, for example, in a circular configuration on the substrate or around an enclosed area of the substrate. The optical sensor elements may be disposed in a rectangular configuration on the substrate or around a square or rectangular enclosed area of the substrate. The optical sensor elements may be disposed in a triangular configuration on the substrate or around a triangular or other-shaped area of the substrate. The device may further include one or more additional optical sensor elements disposed in part of an interior area of the substrate enclosed by the perimeter optical sensor elements.

The optical sensor elements may be, for example, color sensor elements. The color element sensors may be configured to generate signals corresponding to receive illuminance in one or more wavelengths or ranges or bands of wavelengths.

In another aspect, the disclosure relates to a buried object locator including a ground or surface tracking apparatus. The locator may include, for example, a buried object locator module configured to sense a buried object and generate buried object information corresponding with the buried object. The surface tracking module may include one or more sensor arrays which may be configured to detect light reflected from a tracked surface, such as the ground or other surface. The module may include a processing module which may be configured to determine or compute a motion of the buried object locator relative to the tracked surface, based at least in part on a correlation analysis of light patterns associated with the surface. The surface tracking module may be further configured to generate motion information corresponding with the sensed motion. The locator may further include an integration module configured to associate the buried object information with corresponding motion information and store the associated information in a memory.

The buried object locator may, for example, be further configured to generate a controlled light output such as a tracking light pulse or beam, and transmit the tracking light pulse or beam to the tracked surface. The locator may be further configured to generate a map of the buried object relative to the surface. The map may be generated based at least in part on the buried object information and the motion information. The locator may be further configured to provide a visual display of the buried object information and corresponding motion information, such as on a visual display of the locator or other display devices. The processing element or other control elements may be configured to control a light output of at least one output light generator assembly.

In another aspect, the disclosure relates to a method of tracking movement of a device over a surface. The method may include, for example, generating an output light, providing the output light to the surface, receiving reflected output light at a perimeter optical sensor array, and generating information associated with the device movement in a processing element based at least in part on the received reflected light.

The output light may, for example, be generated from an LED assembly. The output light may be provided from a laser light emitter and may be provided to the perimeter optical sensor from a reflector. The reflector may be a three dimensional (3D) parabolic reflector. The optical sensor array may include a plurality of sensor elements, which may be digital output color sensor elements. The information associated with device movement may be location or tracking information. The location or tracking information may be generated in a processing element. The processing element may be configured to receive one or more signals from the input light sensor assembly and generate, based at least in part on the received signals, the location or tracking information.

The method may further include, for example, controlling, from the processing element or other control element, the generated output light. The output light may be controlled in coordination or synchronization with sampling of the light at the perimeter optical sensor array. The output light may be pulsed or otherwise modulated. The output light amplitude and/or color or wavelengths may be varied.

The light amplitude and/or color wavelengths may be varied in coordination or synchronization with sampling of the received light at the perimeter optical sensor array. Multiple sensor elements may be cross-correlated on a many-to-many comparison process to perform height and/or location calculations.

In another aspect, the disclosure relates to one or more computer readable media including non-transitory instructions for causing a computer to perform the above-described methods or functions, in whole or in part.

In another aspect, the disclosure relates to apparatus and systems for implementing the above-described methods or functions, in whole or in part.

It is noted that the following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Referring to FIG. 1A, an embodiment of a buried object locator 100 with an optical tracking assembly/apparatus 102, in accordance with certain aspects, is illustrated. The locator may be any embodiment of an electromagnetic locating device for locating buried or hidden objects, such as the locator devices described in the incorporated co-assigned applications or other similar or equivalent locating devices. Electromagnetic locators typically include one or more magnetic field antennas which may each be single antennas or antenna arrays. In the example locator embodiment 100 of FIG. 1A, three antennas 122, 124, and 126 are shown disposed on an antenna mast 130, however, other locator embodiments may include fewer or more antennas and/or alternate antenna configurations. In embodiments of other devices where a similar ground tracking apparatus may be used, other components and/or configurations may replace the antennas and associated elements as are used in buried object locators while still benefiting from ground or surface tracking functionality as described herein.

A control module 140 may be coupled to or atop the mast 130 as shown in FIG. 1A and may be part of an upper body assembly 104 as shown. The control module 140 may include elements including one or more electronics modules, one or more processing elements or modules including processors, memory, and related components, one or more displays, such as an LCD display or other display elements, user interface elements such as switches, actuators, knobs, mice, joysticks, audio input or output devices, and/or other user interface elements. In an exemplary embodiment the control module 140 may be configured to receive signals from the antennas and determine position information associated with buried objects, such as location relative to the ground or other surface, depth, current flow and/or direction, and the like.

In addition, locator 100 may include an optical ground tracking assembly 102, which may be fixed or, in an exemplary embodiment, removably attached to the upper body assembly 104 of the locator 100 such as shown in FIG. 1A. The locator 100 may, in an exemplary embodiment, be a device such as described in U.S. patent application Ser. No.

13/469,024, entitled BURIED OBJECT LOCATOR APPARATUS AND SYSTEMS, filed on May 10, 2012, which is incorporated herein by reference. A bracket 106 or other coupling mechanism (not shown) may attach the lower end of the optical ground tracking assembly 102 to the antenna mast or one of the antenna shells of the locator 100.

A distance measuring element to determine the distance from a reference point on the locator or ground tracking assembly may be disposed on the ground tracking apparatus or locator. For example, an infrared distance measuring sensor 108 may optionally be attached to the outside of the optical ground tracking apparatus 102 or elsewhere on or within the ground tracking assembly or locator to perform optical sensing. The distance measuring sensor may be a device such as, for example, a GP2Y0A02YKF sensor unit available from SHARP Microelectronics of Camas, Wash. or other distance measuring devices. If an optical sensor is used, the light emitter of the distance measuring sensor may project infrared light over a projection region 110 and then determine the distance to the ground or other surface from the sensor unit. The optical ground tracking assembly 102 may include exterior containers or projections 112 in which controlled light sources, such as laser light sources and LED light sources, for example, may be mounted. These light sources may be used to provide controlled lighting, such as pulsed lights, directional light beams or shapes, or other controlled light features to the ground or other surface during operation.

In an exemplary embodiment, an optical ground tracking device may be constructed in a housing or case having a substantially cylindrical shape using, for example, a single tubular housing 114 or other structural housing, which may include an electronic connection, such as, for example, a USB connector and plug, which may electrically couple the ground tracking device to a processing element or electronics module which may be on a circuit board or other circuit assembly in the body of locator 100, such as in control module 140 as shown. Alternately shapes and configurations of housings, such as square or rectangular-shaped tubes or housings or other shapes (such as ovals, rounder corner rectangular shapes, etc.) may also be used in other embodiments.

In some embodiments a ground tracking apparatus processing element or elements may be disposed within the ground tracking apparatus, such as within assembly 102 as shown. Alternately, or in addition, processing elements for performing the ground tracking processing functionality described herein may be housed within the locator (or other device), such as in control module 140.

Figure 1B:
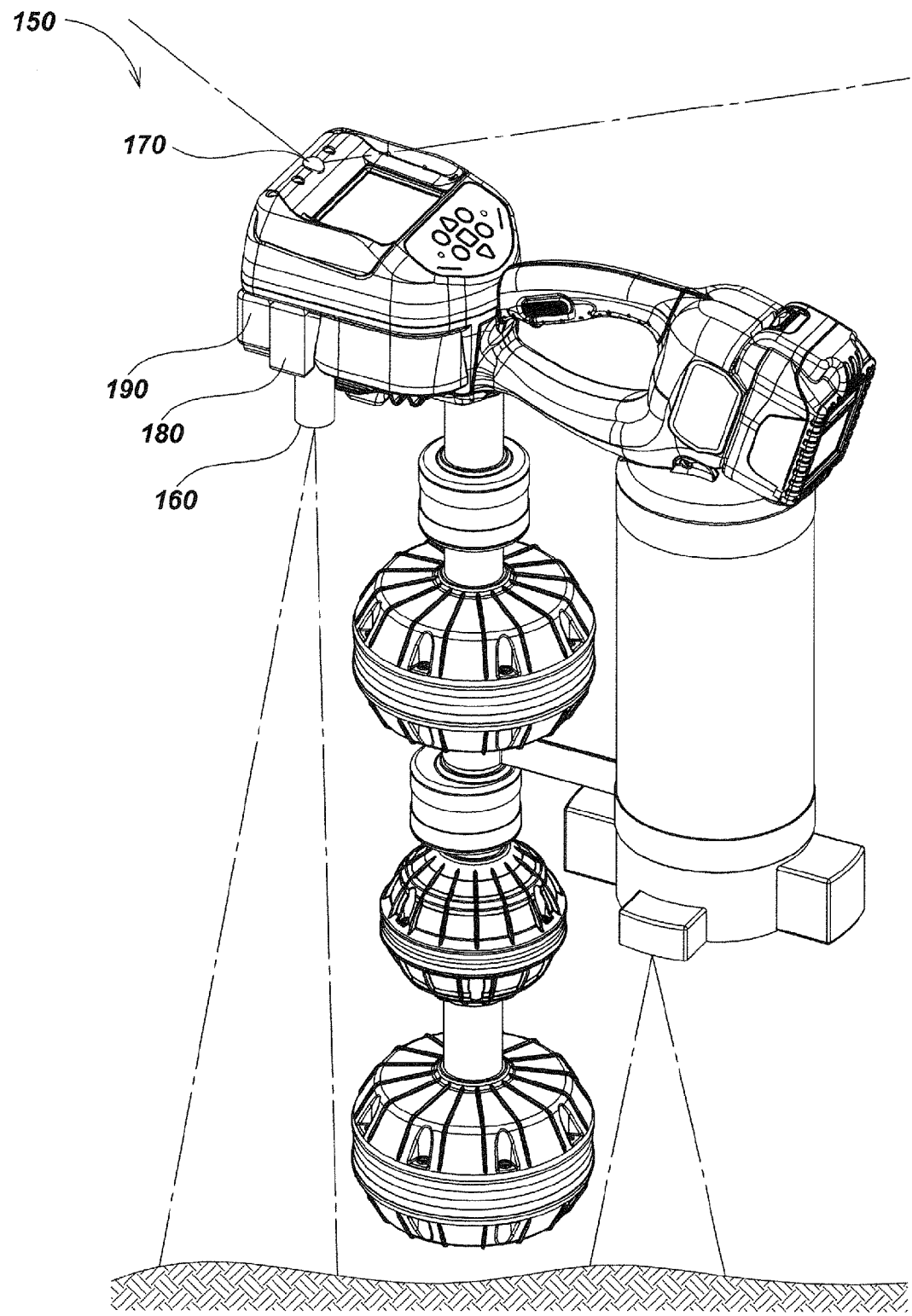

Additional sensors, mechanisms, and apparatus may be used in conjunction with a ground tracking apparatus and/or locator with a ground tracking apparatus in keeping with the present disclosure. For example, as illustrated in FIG. 1B, a locator embodiment 150 which may be similar to the locator embodiment 100 of FIG. 1A with the addition of a light detection and ranging (LIDAR) apparatus 160, a upward facing vertically oriented camera 170, a laser range finder mechanism 180, and a laser Doppler apparatus 190 is illustrated. The LIDAR apparatus 160 may allow for measuring of height and distance from the ground surface. The LIDAR apparatus 160 may further create a 3D point cloud. The camera 170 may be used for sun position tracking as well as to view and record the user. The laser range finder mechanism 180 may be used to measure the height of the device off the ground on one or more locations. The laser Doppler apparatus 190 may be used to measure over ground velocity, and/or speed, and/or direction. Numerous other sensors, mechanisms, and apparatuses that may be used in conjunction with a ground tracking apparatus and/or locator with a ground tracking apparatus in keeping with the present disclosure may be readily apparent to those skilled in the art.

Figure 2:
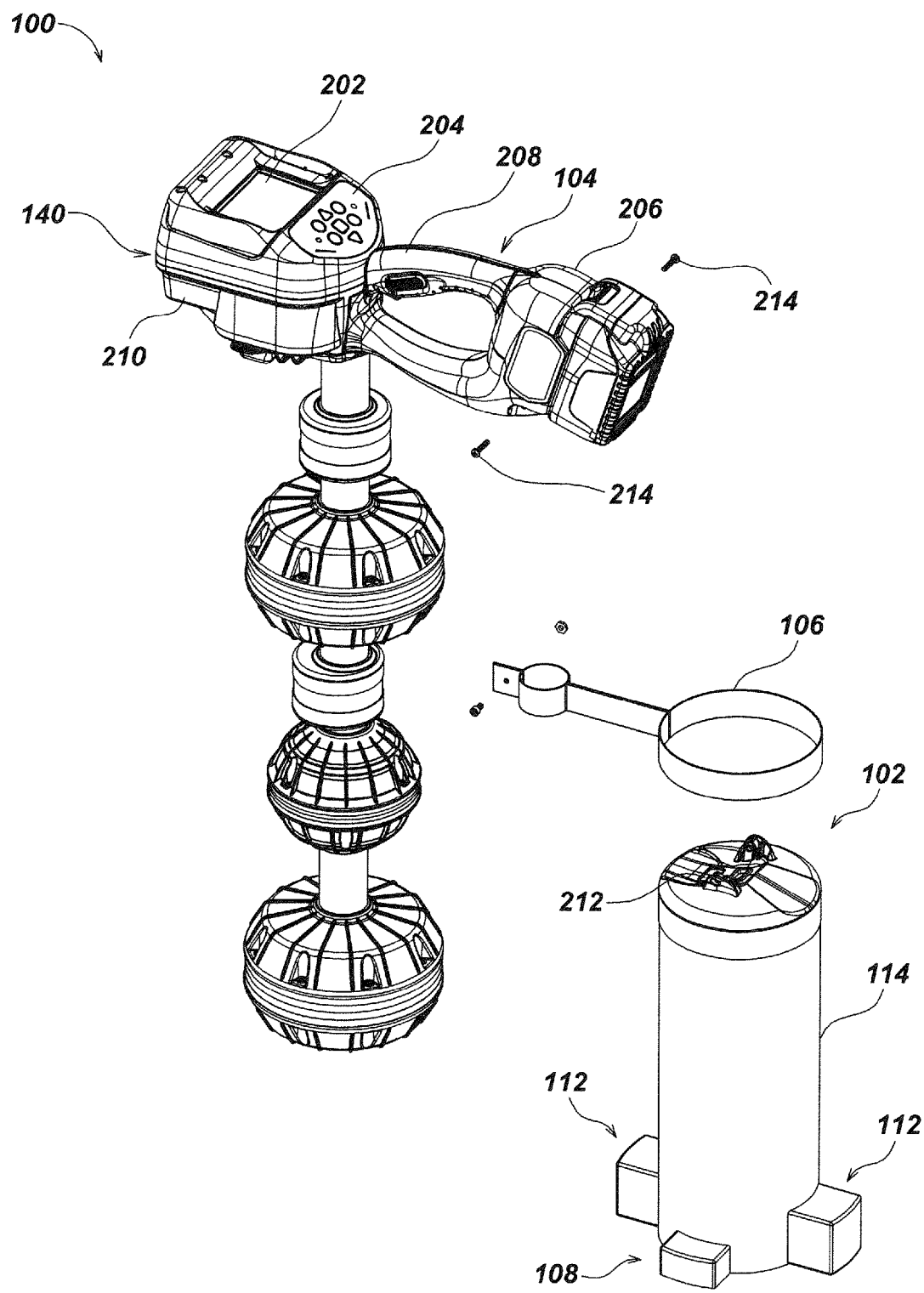
FIG. 2 is a partially exploded view of the locator and the optical ground tracking attachment.
Figure 3:
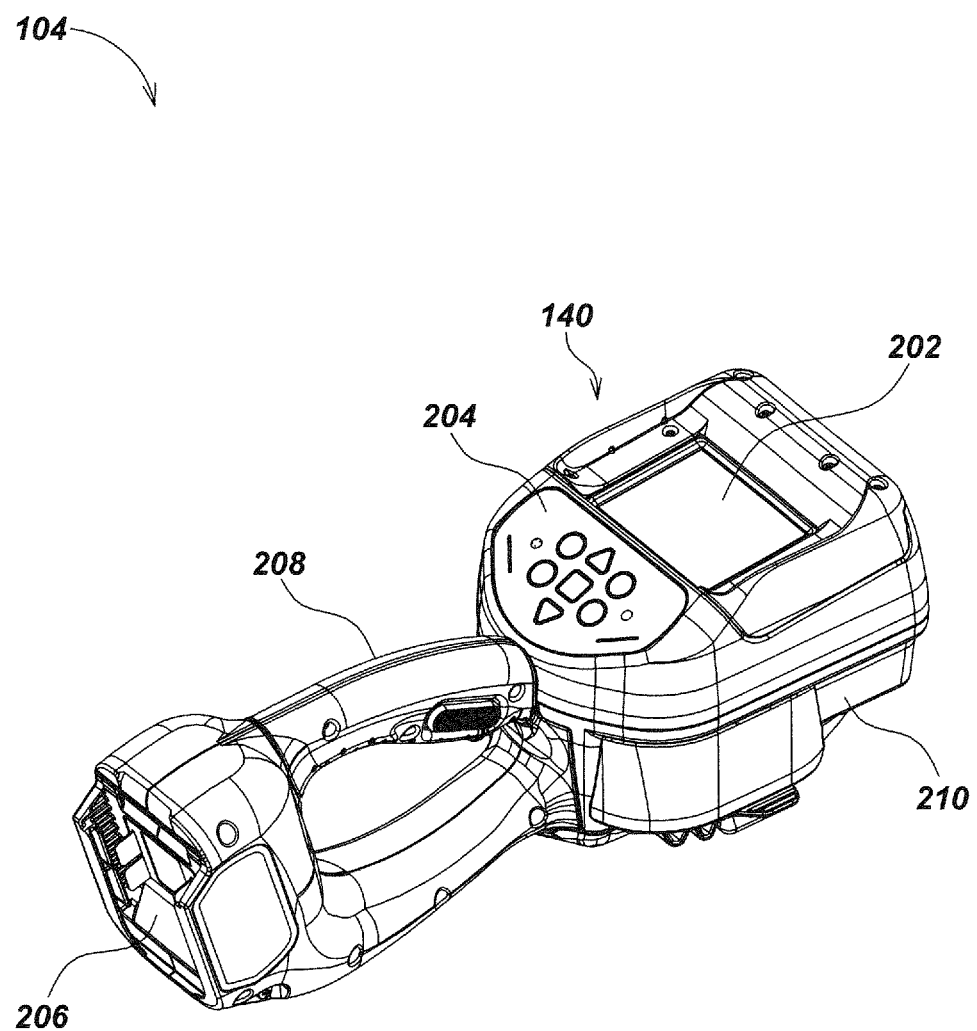
FIG. 3 is a perspective view of the locator upper body assembly.

Referring to FIGS. 2 and 3, the upper body assembly 104/control module 140 may include user interface elements such as a display screen 202, a control panel 204, as well as a battery dock 206, and a handle 208 assembled on or within a locator housing 210. A Universal Serial Bus (USB) connector 212 may be used to electrically connect the optical ground tracking assembly 102 to the upper body assembly 104, and may be supported by screws 214 or other attachment mechanisms. In an exemplary embodiment USB interfacing may be used to provide data between the locator and ground tracking apparatus, however, in other embodiments alternate signaling mechanisms may be used, such as other serial buses, parallel data buses, wireless connections, optical connections, and the like.

Locator 100 may include an intelligent battery 230, along with associated docking and interface circuitry such as described in, for example, co-assigned U.S. patent application Ser. No. 13/532,721, entitled MODULAR BATTERY PACK APPARATUS, SYSTEMS, AND METHODS, filed Jun. 25, 2012, the content of which is incorporated by reference herein. The control module 140 and/or other modules or processing elements in the locator may include intelligent battery functionality and viral data and/or code transfer functionality such as is described in the '721 application and in co-assigned U.S. Patent Application Ser. No. 61/663,617, entitled MODULAR BATTERY PACK APPARATUS, SYSTEMS, AND METHODS INCLUDING VIRAL DATA AND/OR CODE TRANSFER, the content of which is incorporated by reference herein.

Figure 4:
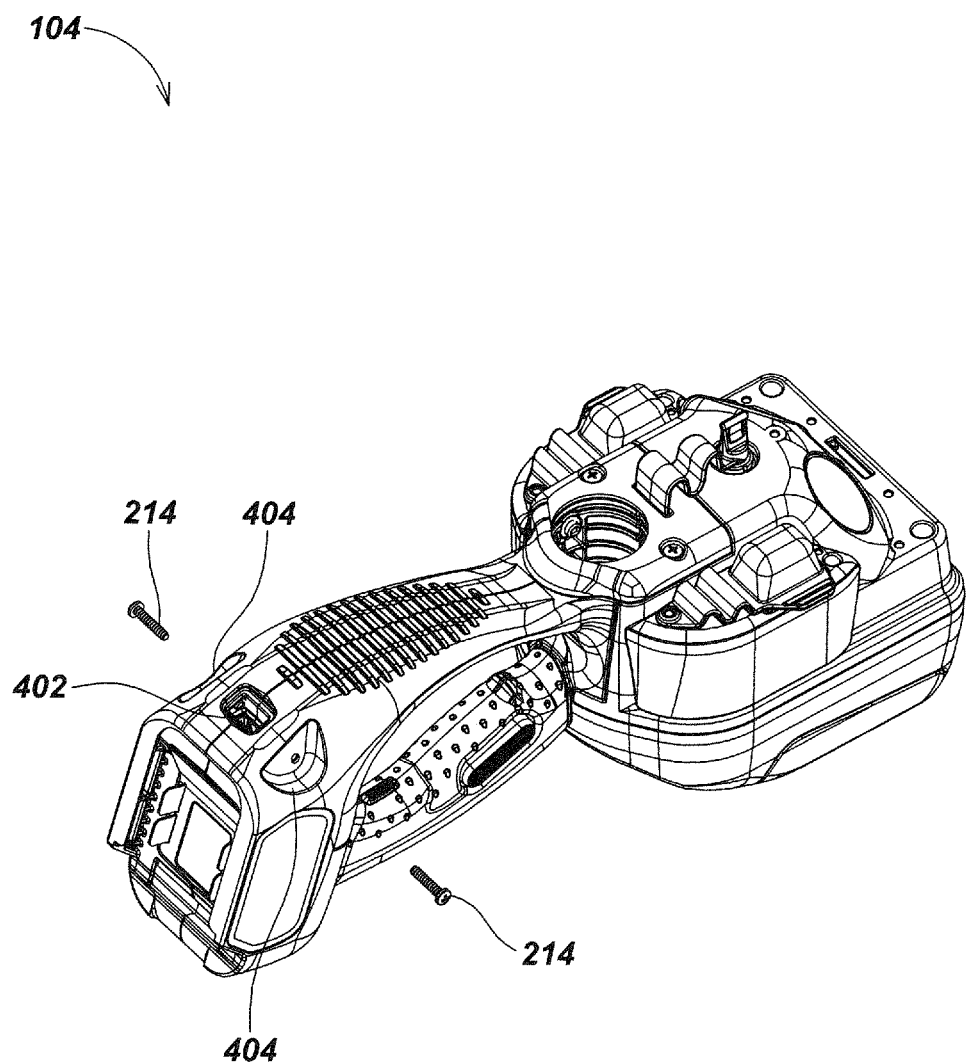
FIG. 4 is a bottom view of the locator upper body assembly of the locator in FIG. 1A.

Referring to FIG. 4, details of the upper body assembly 104 of locator embodiment 100 is illustrated from below. A USB socket 402 may be disposed on or within the upper body assembly 104, such as by being formed into the base of upper body assembly 104. The USB socket may be configured to provide a connector to electrically attach the optical ground tracking assembly 102 (FIG. 1A) to the locator 100 (FIG. 1A). In alternate embodiments other wired or wireless data connection circuitry and configurations may also be used. The upper body assembly 104 may be formed with an indentation 404 on either side to which the optical ground tracker assembly 102 (FIG. 1A) may be attached mechanically, for example, by using support screws 214 or other attachment mechanisms. In alternate embodiments, various other fixed or detachable mechanisms may be used to secure, either fixedly or removably, the ground tracking apparatus 102 to the locator 100 or to other devices to which it is coupled.

Figure 5:
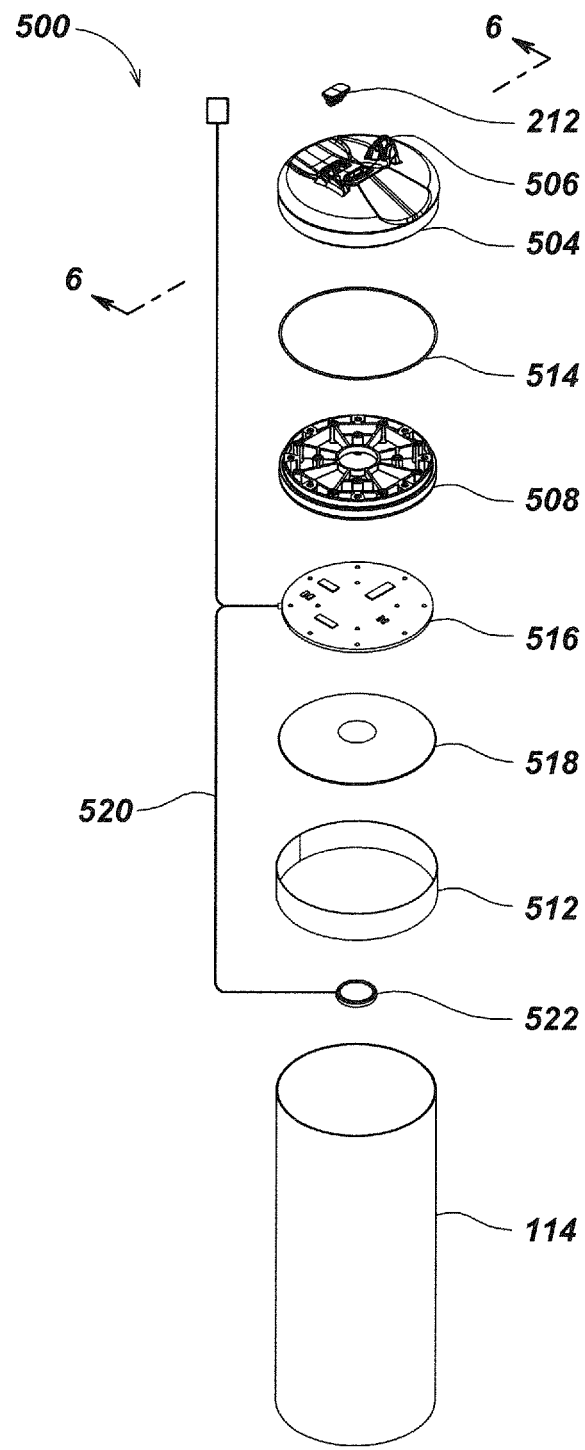
FIG. 5 is an exploded view of the outer structure of the tube subassembly of the optical ground-tracking device of FIG. 1A.

Turning to FIG. 5, an exploded view of an exemplary optical ground tracker tube subassembly 500 with reflective optics is shown. In an exemplary embodiment, a USB connection may be used to electrically couple the ground tracker assembly 102 to the locator 100 to provide signal connectivity. For example, a USB plug 212 may be seated so as to protrude from the upper end of the tube subassembly 500 and allow connection of a USB cable between the subassembly 500 and locator 100. A mounting cap 504 may be formed so as to support the USB plug 212 and may further be formed, for example, with mounting lobes 506 sized to attach to the indentations (404 in FIG. 4) in the upper body assembly (104 in FIG. 2). Although the illustrated embodiment is shown in a cylindrical, circular cross-sectioned configuration, other shapes, such as square, oval, rectangular or other cross sectional tubes, as well as tubes of varying crosssectional shape and/or sizes may be used in alternate embodiments.

An inner mount shell 508 may be seated with an O-ring 514 to the mount cap 504 by threading or other attachment mechanisms. A tubular housing 114 may be formed of carbon fiber, for example, or other lightweight materials, and may be joined to the inner mount shell 508 by threading or other attachment mechanisms. The junction between the tubular housing 114 and the mount inner shell 508 may be sealed for protection, for example, by use of a sealing element, such as a tape seal 512 or other sealing mechanisms. A printed circuit board (PCB) 516 may be mounted below the mounting cap. Position, location, motion and/or orientation sensors may be mounted, such as a 9-axis Invensense MPU-6000 combination gyroscope and accelerometer MEMS unit, for example, with a combined magnetometer on the printed circuit board or elsewhere in the ground tracking assembly to provide motion, position, orientation, and/or location information to be used as described subsequently herein in generating tracking information. Other motion sensors and orientation sensors may also be used in various embodiments, such as, for example, compass sensors, multi-axis accelerometers, GPS modules, wireless modules, and the like.

In some embodiments reflective optics as shown in FIG. 5 may be used to direct light for imaging the ground or other surfaces. For example, an optical ground tracker assembly may include an optical reflector, such as a reflective, curved optical-grade mirror such as reflecting mirror 518 as shown, or other mirror or reflective elements. The reflecting mirror 518 may be positioned and aligned to reflect incident rays of light onto a sensor array. Such a reflector may, for example, be constructed of optically coated glass and/or other reflector materials.

A wire harness 520, or other conductor configurations, may be used to electrically connect the PCB with other circuit boards and corresponding connectors and circuit elements on the locator 100 (FIG. 1A).

An optical light-sensor assembly may be positioned within the optical ground tracker to receive light from a surface of interest. For example, a perimeter light sensor array 522 may be positioned centrally located along the axis of the tubular housing 114 such that incident light is reflected from the reflecting mirror 518 onto the sensor assembly 522. As described subsequently with respect to FIGS. 11A-11D, the perimeter light sensor array includes a plurality of light sensing elements arranged around the perimeter or other enclosed area of a sensor substrate to sense received light. Additional sensor elements within the enclosed area may also optically be included on the sensor array to provide additional sensing data.

In operation, as the locator or other instrument, along with the ground tracking apparatus, moves over the ground or other surface the perimeter light sensor array elements sense movement of features, with the sensed information then processed by cross-correlation and/or other processing techniques to determine motion/position information. Examples of this are described subsequently herein. By reducing the number of sensing elements from a full grid or array to a subset including perimeter sensing elements, and, optionally some interior sensing elements, processing requirements such as for performing cross-correlations may be greatly reduced from performing similar processing over an entire grid of sensor elements.

Figure 6:
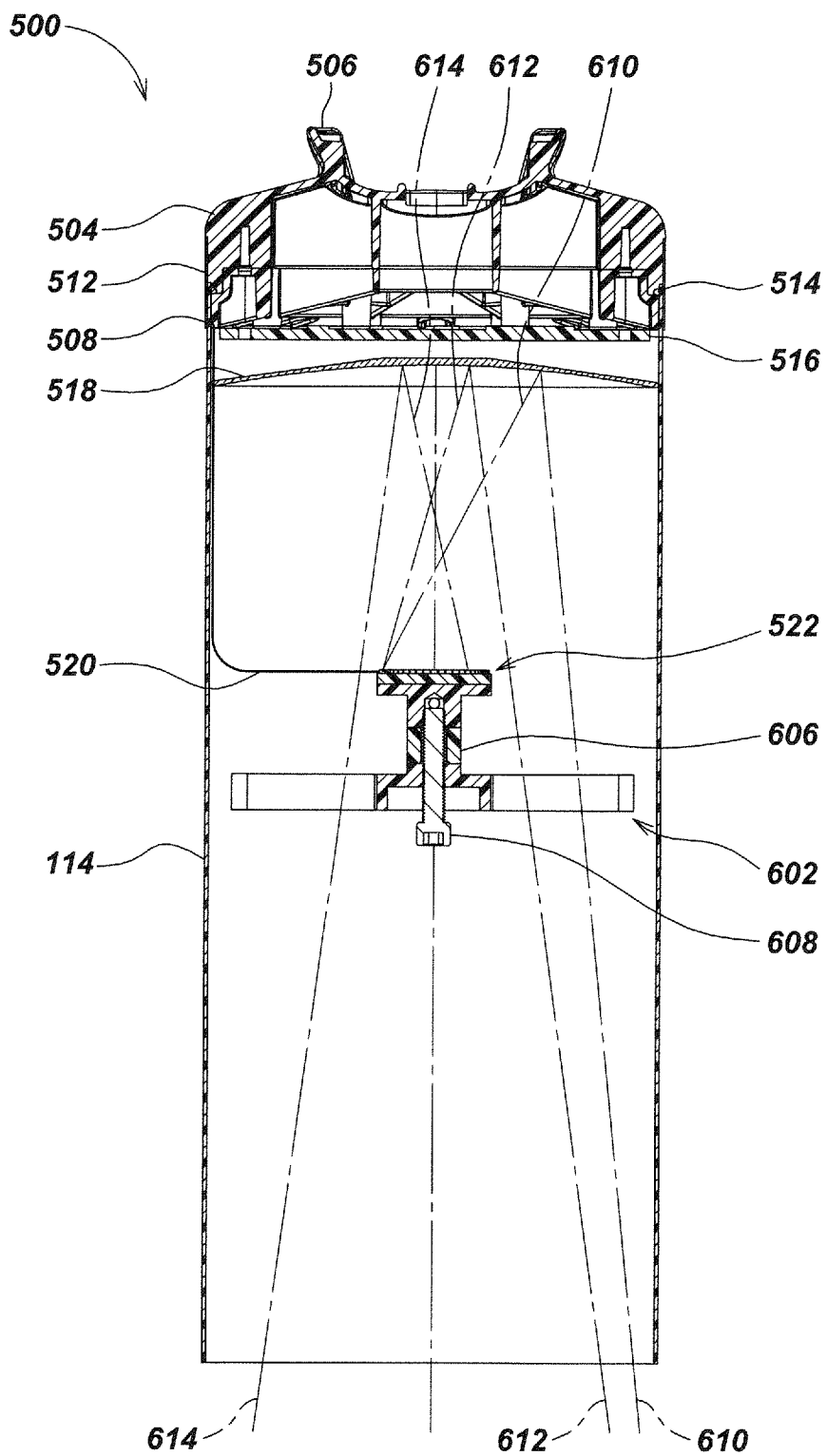
FIG. 6 is a side sectioned view of the optical ground tracking attachment embodiment of FIG. 1A with a schematic illustration of light ray tracing.

Turning to FIG. 6, an embodiment of an optical ground tracker tube subassembly 500 using reflective optics is illustrated in cross-section. Within a tubular housing 114 a support platform 602 may be formed which may, for example, consist of a central island, which may be configured in an approximately circular form in an exemplary embodiment and may be supported by three formed arms or other support structures. A sensor assembly 522 may be mounted to the support platform 602 using a support block 606 or other attachment mechanism. An adjusting screw 608 or other adjustment mechanism may be used for calibration and fine tuning. In alternative embodiments the sensor assembly 522 may be fixed in position relative to a reflecting mirror 518.

The reflecting mirror 518 may be retained or attached, for example, at or near the top of the tubular housing 114. The disposition of the reflecting mirror 518 and the sensor assembly 522 may be designed such that incident light ray 610, light ray 612, and light ray 614, for example, will each be reflected so as to impact a corresponding sensor area on the sensor assembly 522. It will be appreciated that these exemplary rays are illustrative only, and that in actual use, incident rays of light may arrive from all directions and be reflected by the curved reflecting mirror 612 so as to impact some part of a circular array of sensors on the sensor assembly 522. Although FIG. 6 illustrates an exemplary reflective optics configuration, in alternate embodiments refractive optics, such as are shown in the example embodiment of FIG. 14, may also be used.

Figure 7:
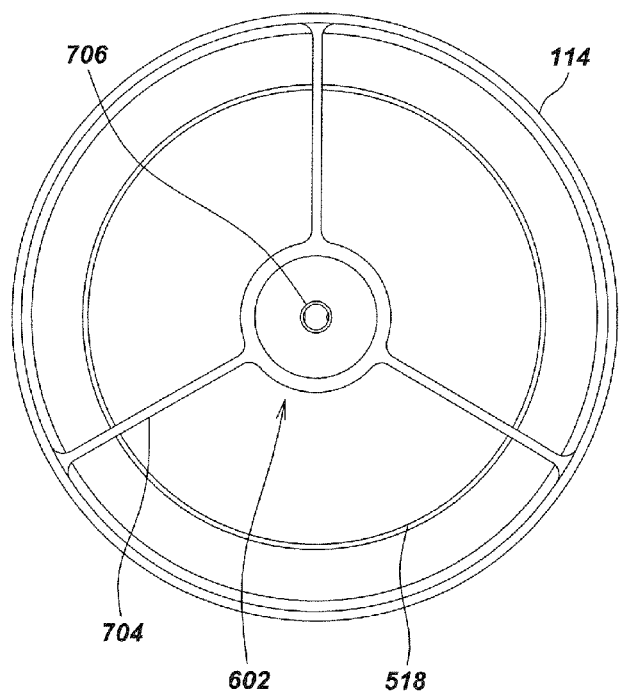
FIG. 7 is a bottom view of the optical ground tracking attachment embodiment of FIG. 1A.

Turning to FIG. 7, an exemplary design of a support platform (602 in FIG. 6) for the perimeter sensor array 522 is shown in a planar view. In the interior of the tubular housing (114 in FIG. 5), a plurality of molded arms 704 may be formed to support central formed platform 602 with a central threaded opening 706 which may, for example, retain the threaded adjustment screw (608 in FIG. 6). The reflecting mirror 518 (FIG. 5) may be so seated or attached as to be coaxial with the support platform 602 and the sensor assembly (522 in FIG. 5). Other mounting and calibration mechanisms may also be used in alternate embodiments to position the perimeter sensor array relative to a reflecting mirror.

Figure 8:
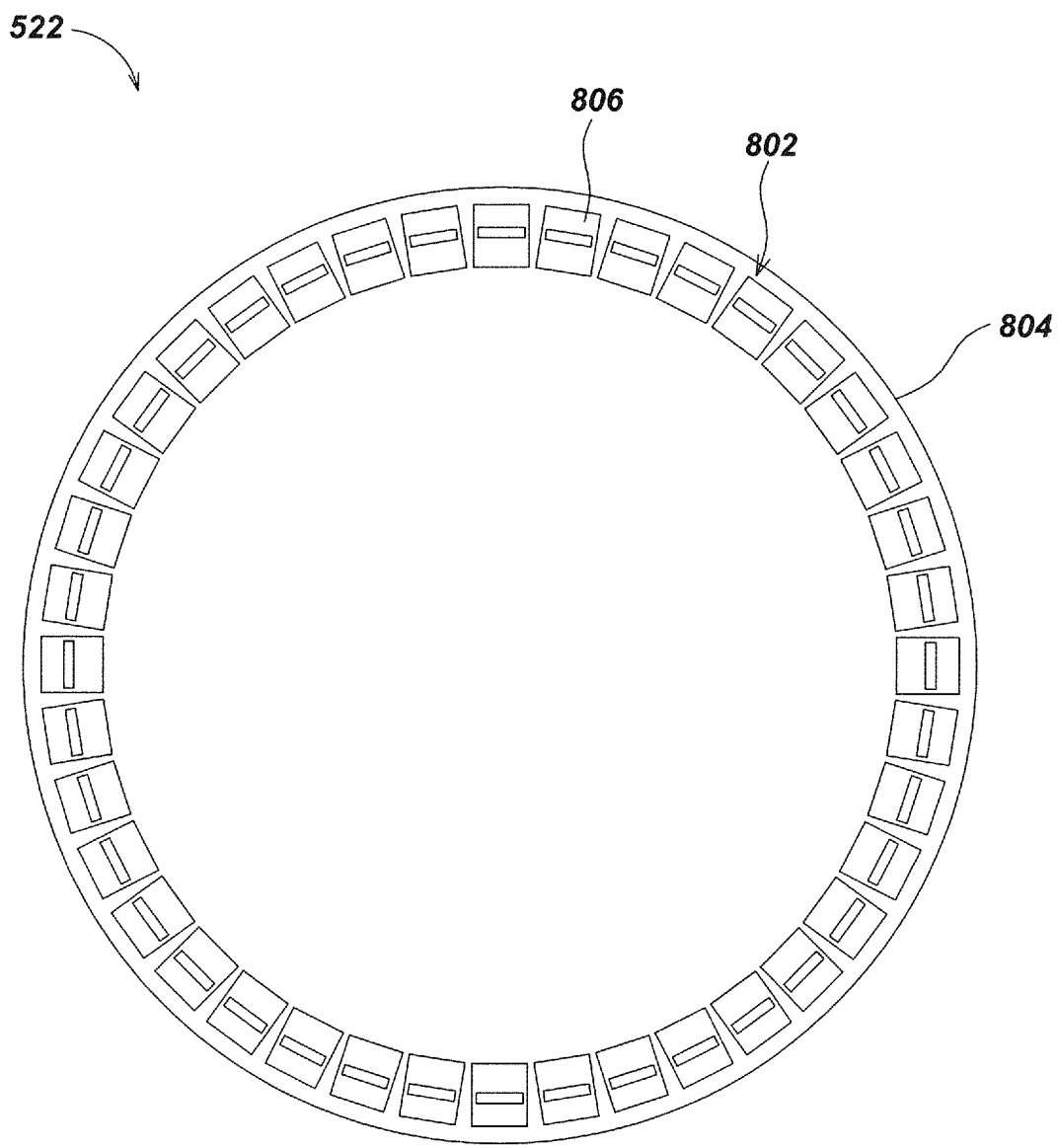
FIG. 8 is a top view of an embodiment of a light-sensor circuit board of the optical ground tracker.

Turning to FIG. 8, details of the perimeter sensor array assembly embodiment 522 are illustrated. In an exemplary embodiment the sensor array includes a substrate, such as a printed circuit board (PCB) 804, supporting an array 802 of sensor elements 806 arranged around the perimeter or other enclosed area of the substrate. Sensor array 802 may be a sensor array of ones of a plurality of individual color sensor elements 806 such as, for example, are included in the Texas Advanced Optoelectronic solutions TCS3404, manufactured by Texas Advanced Optoelectronic Solutions (TAOS) of Plano, Tex., or other multi-color element sensor arrays. The color sensors 806 may be disposed around the perimeter of the sensor PCB 804 as shown to enclose an area on which a corresponding area of the ground or other surface is to be imaged. In an exemplary embodiment, forty separate sensor elements 806 may comprise the sensor array 802, however, other numbers, types, shapes, and/or arrangements of sensor elements may be used in various configurations.

The TCS3404, for example, is a 16-bit sensor which produces data on red, green, blue and clear color values. The TCS3404 digital color light sensors derive color chromaticity and luminance (intensity) of ambient light and provide a digital output with 16-bits of resolution. The individual sensors may include, for example, an 8×2 array of filtered photodiodes, analogto-digital converters, and control functions on a single monolithic CMOS integrated circuit. Of the sixteen photodiodes, for example, four may have red filters, four may have green filters, four may have blue filters, and four may have no filter (clear), in an exemplary design. The TCS3404 digital color light sensors further supports a synchronization function enabling it to be synchronized with pulsed light if desired. Additional details of this sensor element are further illustrated in FIG. 15. While the TAOS sensors may be used in an exemplary embodiment, other sensor types and sensor configurations may be used in various embodiments. For example, alternative arrangements of sensors, sensor types, and different numbers of sensors may be used in various embodiments.

In another aspect, controlled light, such as a laser light source or other controlled light source, may be used to augment the precision of positional computation by an optical or optical-mechanical ground tracking apparatus such as described herein. In another aspect, other sources of illumination, such as an array of LEDs or other visible, IR, and/or UV light sources may be used to augment ambient light used in the optical ground tracking process. Controlled lighting may be shaped in the form of projected lines or other shapes, such as through use of a diffraction grid or other mechanism, and may be pulsed or otherwise modulated in conjunction with sensing done at the perimeter sensor array or other elements of the ground tracking apparatus.

Figure 9:
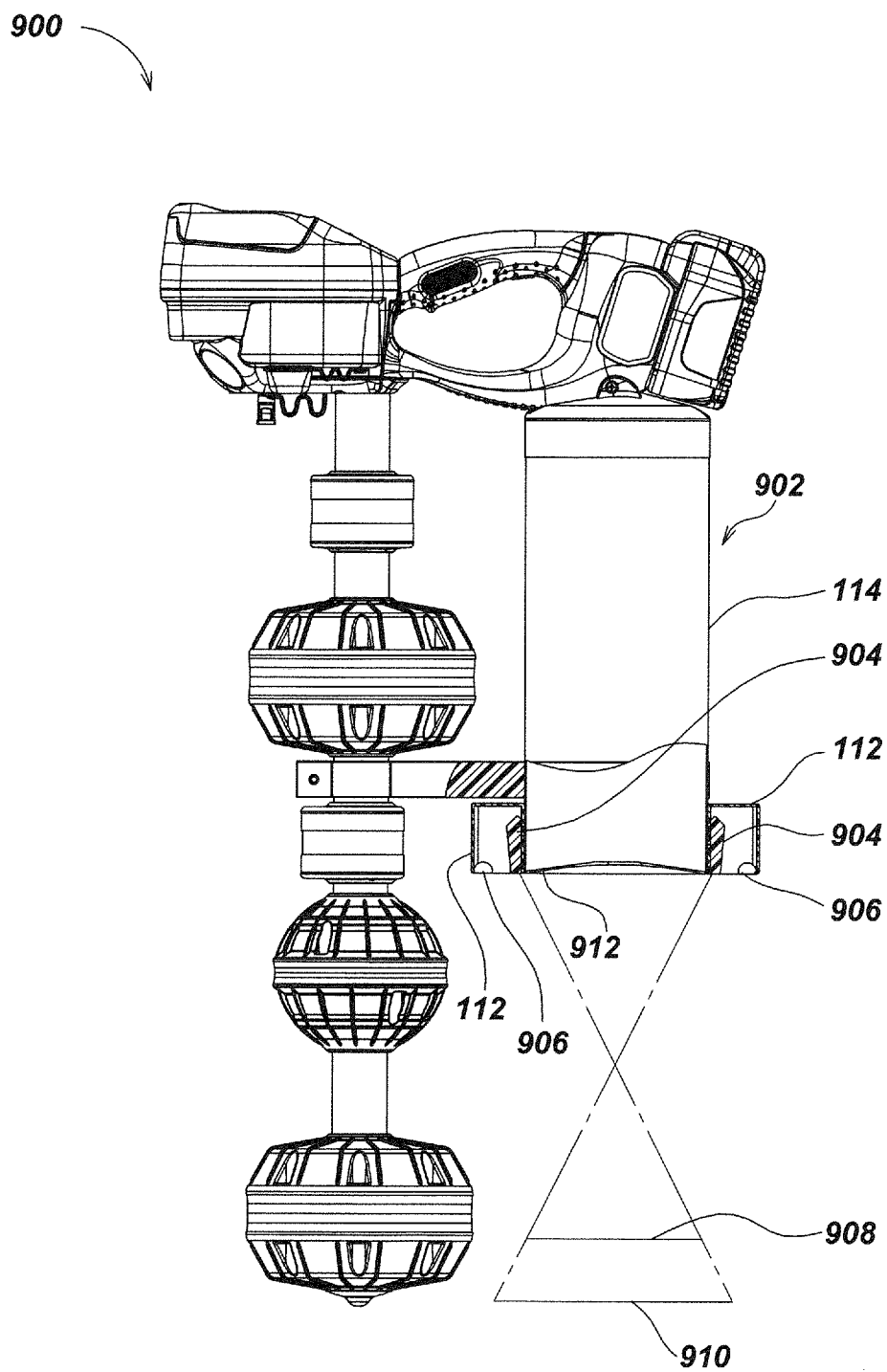
FIG. 9 is a cutaway view of the locator and optical ground tracking embodiment illustrating light paths from a laser illumination.

Turning to FIG. 9, an embodiment of an optical ground tracking locating system 900 with controlled lighting, such as a plurality of laser illumination units 904, which may be positioned on or within the exterior surface of the optical ground tracking device 902, is illustrated. A plurality of LED illumination units 906 may be similarly mounted to augment ambient light in the optical ground tracking process. The laser units 904 may be so disposed that, for example, one laser unit may project a line 908 in red light, for example, and the other may project a separate line 910 of red light along the ground. Other frequency lasers, such as green-light-emitting lasers, or other colors or combinations of colors may also be used.

The length of the line 908 and the line 910, and the apparent distance of line 908 from line 910, will vary with the height above ground of the locator 900 at any given moment. The reflected light from line 908 and from line 910 will intercept different individual color sensors 806 (FIG. 8) in the circular color sensor array 802 (FIG. 8) and will produce different signals in different individual sensors 806 (FIG. 8). A comparative algorithm may be encoded as instructions stored on a computer-readable media and may be implemented in a processing element in the locator and/or ground tracking device. The comparative algorithm may perform cross-correlations by rapidly compares the values of each sensor 806 (FIG. 8) with those of each other sensor 806 (FIG. 8) in the sensor array 802 (FIG. 8) for a given moment in time to determine relative distance information. In addition, information regarding tilts or other shifts in orientation may also be performed by similar processing based on points of intersection of the line with the perimeter array sensor elements. In other embodiments different shapes may alternately be projected onto the ground or other surface from the light source and correspondingly processed.

A calibration of the locator system 900 may be used which enables the system to derive precise height above ground of the locator 900 at any instant based on the cross-correlation of color values, and the location and angle of separation of those sensors where different color values, including peak red-filter values, have been recorded. A single laser projection will produce two such computable elevation points; dual lasers may be used as in FIG. 9 to produce four computable elevation points, thus enabling the derivation of angle or attitude of the locating unit at a given instant. More than two laser units 904 may be used, for example, to produce a variety of formed light patterns for reflection. Additional supplementary optics 912 in the form, for example, of a fitted light lens, may be attached to the tubular housing 114 to guide and/or form incident light beams or light beams reflected from a ground surface, for example. Alternative supplementary optic designs may be used, such as, for example, smaller lenses mounted on the inner circumference of the tubular housing 114.

In one aspect of the present disclosure, a locator may electronically perform onboard processing to derive velocity and height measurement from the values returned by multiple color sensors of the perimeter sensor array. In such processing the signal from each color sensor may be measured as a function of time. Signal data from every color sensor in sensor array 802 (FIG. 8) may be cross-correlated with signal data from every other color sensor for a given point in time. Samples may be taken sequentially in time and then cross-correlated across time offsets. In some embodiments, sample rate may be adjusted based on additional received information, such as motion information received by other sensors such as inertial, compass, GPS, or other sensors.

For each cross-correlation, there is a peak value at some time offset, $\tau_{ij}$. There is likewise a spacing vector between each color sensor, $\vec{\delta}_{ij}$. For each sensor triple, a velocity vector may be found that depends on the location of the sensors. For example, if the first sensor is at the origin, the second sensor at $\delta\hat{y}$ and the third sensor at $+\delta\hat{x}$, then, it can be shown that:

$$\tan\theta = \tau_{13}/\tau_{12}$$

The angle $\theta$ is the angle between the direction of motion and the y axis. The magnitude of the velocity vector may be found from:

$$v = \frac{\delta}{\tau_{13}}\sin\theta$$

Similar equations may be determined for different geometries of sensors such as the forty-sensor array in FIG. 8, for example.

Figure 10A:
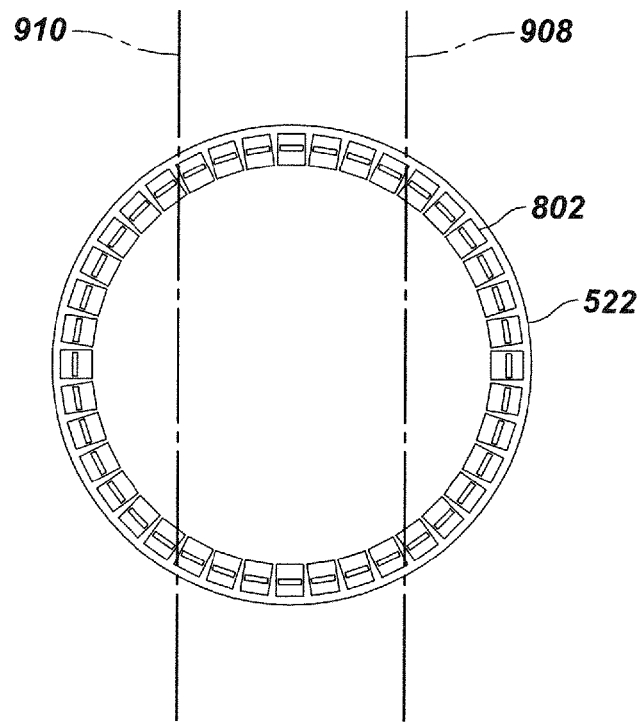
FIGS. 10A & B are illustrations of light beams from a laser light emitter intercepting a sensor array.
Figure 10B:
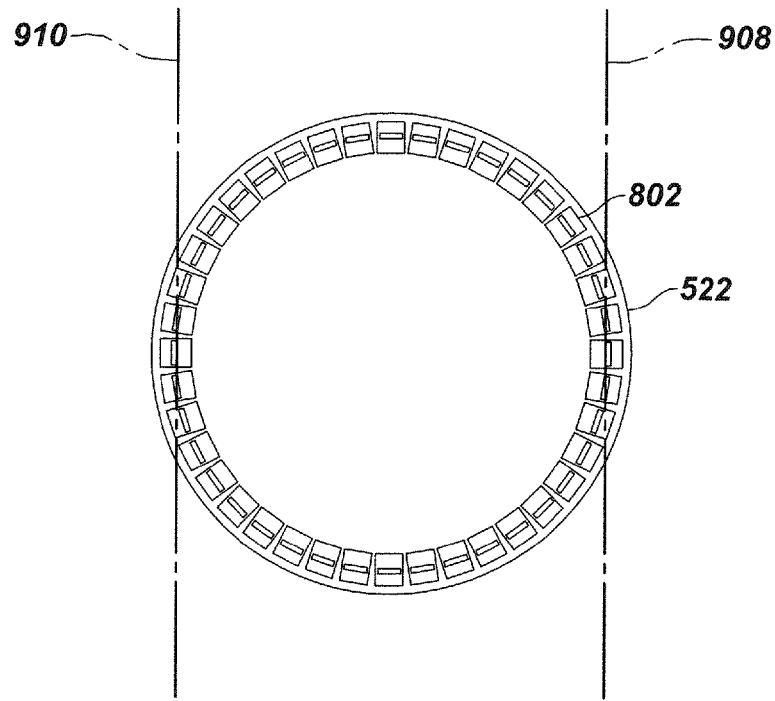

Turning to FIGS. 10A and 10B, the use of formed light patterns such as laser light line 908 (FIG. 9) and laser light line 910 (FIG. 9) may be used to interpolate the calculated height of a locator above ground.

In FIG. 10A the impact of reflected light from laser light lines 908 and 910 is shown in a first position as the reflected light strikes the sensor array 802. The correlation of each sensor's output on four color channels (red, blue, green and clear) with the output from every other sensor in the array 802 will yield a unique composite digital profile for this event. In FIG. 10B the impact of reflected light from laser light lines 908 and 910 is shown in a second position as the reflected light strikes the sensor array 802. It will be appreciated that the laser light lines 908 and 910 are further apart in FIG. 10B than they are in FIG. 10A, and strike different components of the sensor array 802. The difference in the relative positions of laser light line 908 and laser light line 910 in FIG. 10B (compared to FIG. 10A) may be attributable to the locator (and the light emitters) being at a greater height above the reflecting surface. As a result of cross correlation between all the sensors comprising the sensor array 802, this difference may be precisely quantified in comparing the unique composite digital profiles of the two events illustrated.

In another aspect, color sensors may be combined with inertial, gyroscopic, and compass sensors to refine location measurement. In an exemplary embodiment, such orientation and motion sensors may be integrated into PCB 516 (FIG. 5) for example, and their digital output integrated into the computation occurring in the locator CPU circuitry. It will be appreciated that the digital output from a 9-axis inertial sensor package, for example, will greatly enhance the ability of the locator to differentiate among locations when integrated with the moment-to-moment correlations of data from the light sensor array 802 during the locate process.

In another aspect, the use of this combination of sensors with a utility locating receiver provides data which may be used to integrate locate detections with maps, satellite images, and/or area photographs.

FIGS. 11A to 11D illustrate example embodiments of perimeter optical sensor arrays that may be used in various ground or surface tracking devices. In addition to these example embodiments, other embodiments of perimeter sensor array assemblies of various shapes, sizes, numbers of sensors, and arrangement of sensor elements may be used in alternate implementations. In general, perimeter optical sensor arrays include sensor elements covering all or substantially all of a peripheral area of the sensor, such as around the perimeter of a circular, rectangle, triangle, oval, or other-shaped area. In some embodiments, some additional interior sensor elements may also be used to enhance processing performance and/or functionality, such as by providing sensed optical values as particular positions in the interior of the array (in addition to the sensed perimeter values). In addition, in some embodiments, grid-type sensor arrays may be used to provide similar functionality by selecting, measuring, and processing signals from pixels around the perimeter of the array while omitting use of all or some of the interior pixel measurements on the array. For example, pixel values from pixels on the perimeter of a square or rectangular sensing element may be used, optionally along with some interior pixel values, while the remaining values may be either ignored, discarded, or not collected or sent from the sensor element to a processing element, Turning to FIG. 11A, an example embodiment 1100A of a perimeter optical sensor array is illustrated. Sensor array 1100A may include a substrate 1110A, such as a printed circuit board integrated circuit device, MEMS device, or other substrate element on which individual sensor element 1120A may be disposed or integrated on or within. In an exemplary embodiment, individual sensor elements 1120A may be a sensor device such as Texas Advanced Optoelectronic Solutions (TAOS) sensor elements as described with respect to FIG. 15, or other optical sensor elements. In the exemplary perimeter optical sensor array embodiment 1100A shown in FIG. 11A, the sensor elements are arranged around the perimeter of the substrate along the circumference and are radially aligned relative to the center of the substrate. This configuration allows for the tightest packing of sensor elements such as the TAOS elements, however, other sensor arrangements, such as sensor oriented in the same X, Y direction, or in other arrangements, may alternately be used in some embodiments.

Figure 11A:
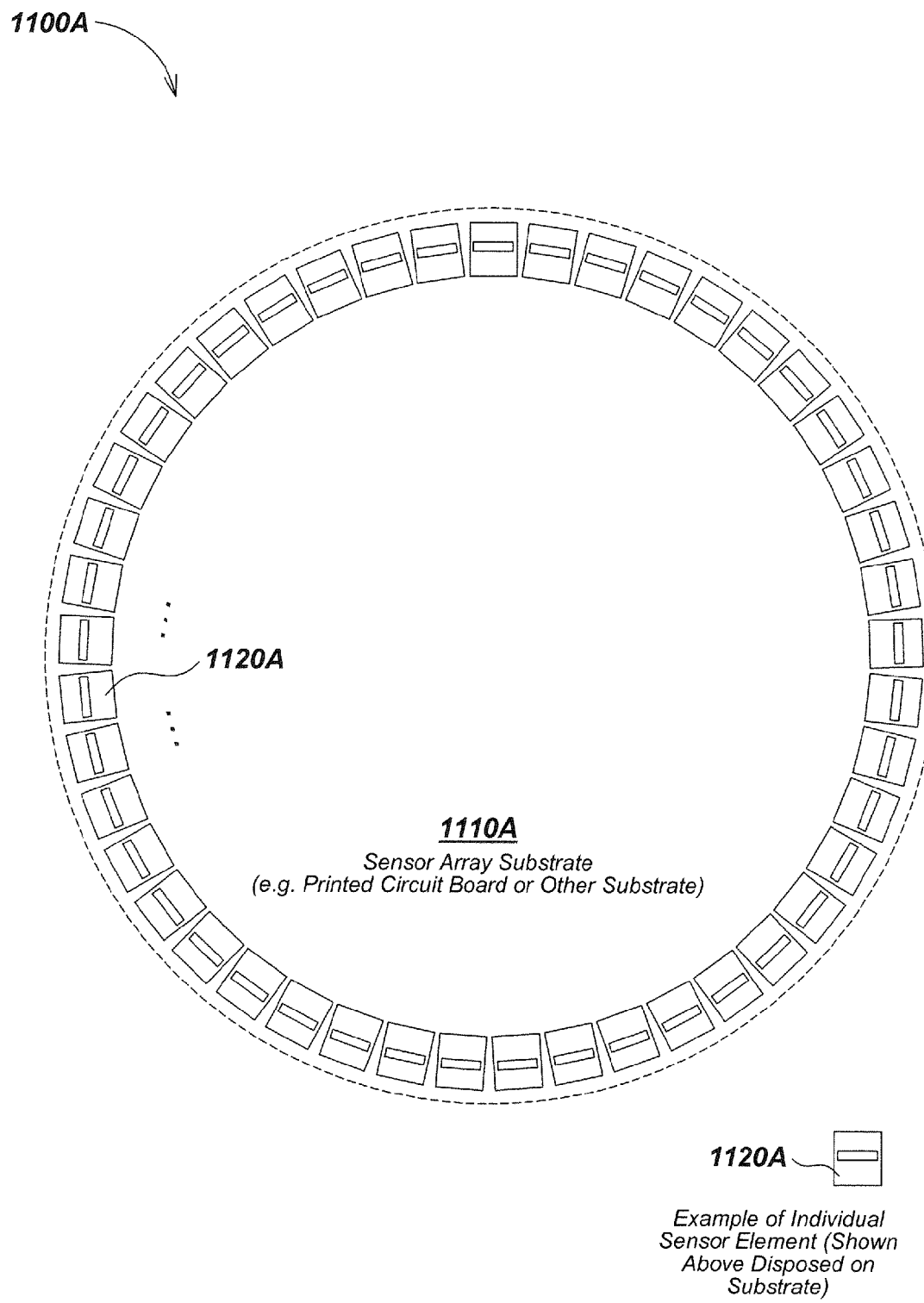
FIGS. 11A-11D illustrate various example embodiments of perimeter optical sensor arrays.
Figure 11B:
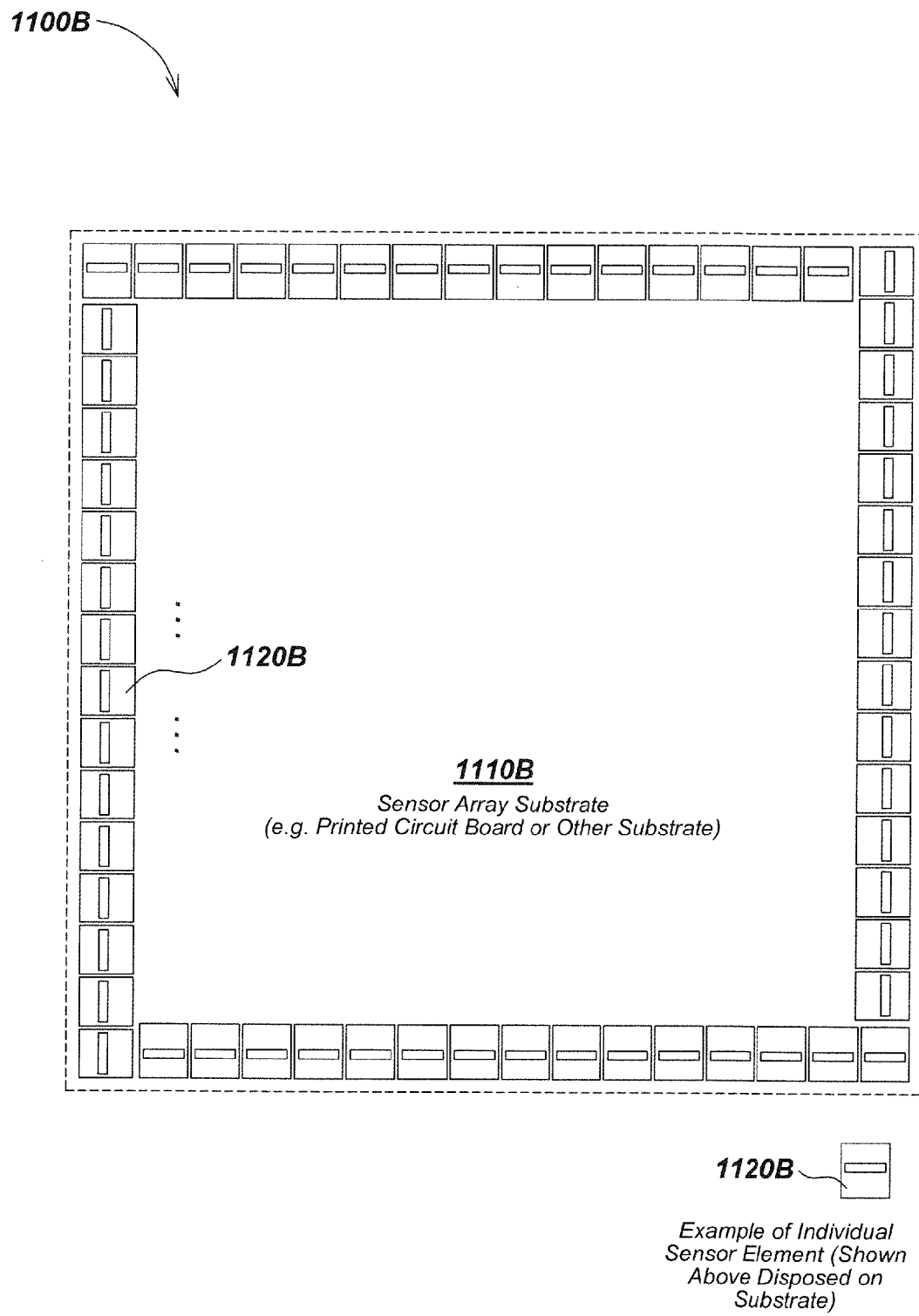

FIG. 11B illustrates another embodiment 1100B of a perimeter optical sensor array, in this case in a square/rectangular configuration. Sensor array 1100B may similarly include a substrate 1110B, such as a printed circuit board integrated circuit device, MEMS device, or other substrate element on which individual sensor elements 1120B may be disposed or integrated on or within in a square/rectangular configuration such as shown. In an exemplary embodiment, individual sensor elements 1120B may be a sensor device such as Texas Advanced Optoelectronic Solutions (TAOS) sensor elements as described with respect to FIG. 15, or other optical sensor elements. In the exemplary perimeter optical sensor array embodiment 1100B shown in FIG. 11B, the sensor elements are arranged around the perimeter of the substrate along the edges and are aligned in the same relative fashion relative to the outer edge of the square or rectangle. However, other sensor arrangements, such as sensor oriented in the same X, Y direction, or in other arrangements, may alternately be used in some embodiments.

Figure 11C:
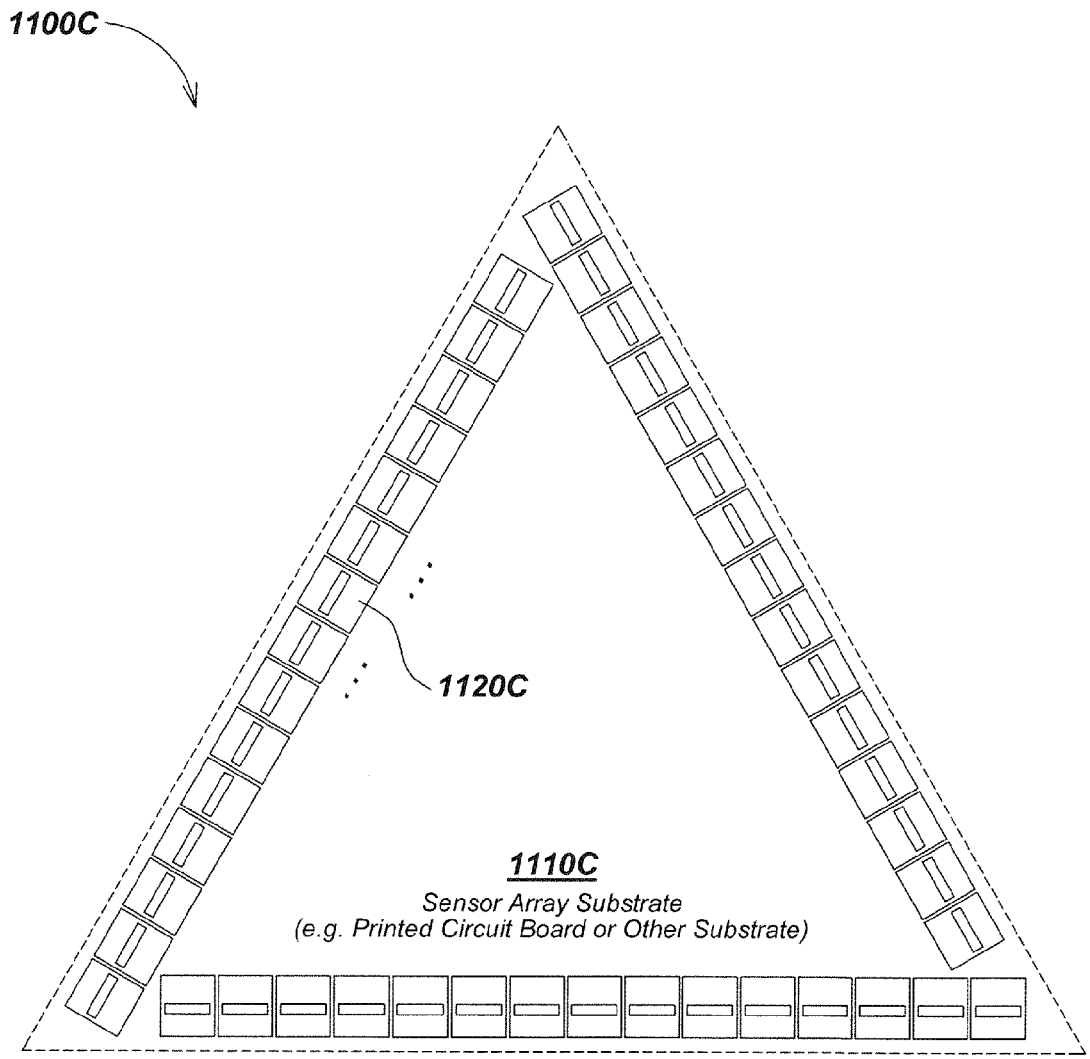
Figure 11C:

FIG. 11C illustrates yet another embodiment 1100C of a perimeter optical sensor array, in this case in a triangular configuration. Sensor array 1100C may similarly include a substrate 1110C, such as a printed circuit board integrated circuit device, MEMS device, or other substrate element on which individual sensor elements 1120C may be disposed or integrated on or within in a square/rectangular configuration such as shown. In an exemplary embodiment, individual sensor elements 1120C may be a sensor device such as Texas Advanced Optoelectronic Solutions (TAOS) sensor elements as described with respect to FIG. 15, or other optical sensor elements. In the exemplary perimeter optical sensor array embodiment 1100C shown in FIG. 11C, the sensor elements are arranged around the perimeter of the substrate along the edges and are aligned in the same relative fashion relative to the outer edge of the triangle. However, other sensor arrangements, such as sensor oriented in the same X, Y direction, or in other arrangements, may alternately be used in some embodiments.

Figure 11D:
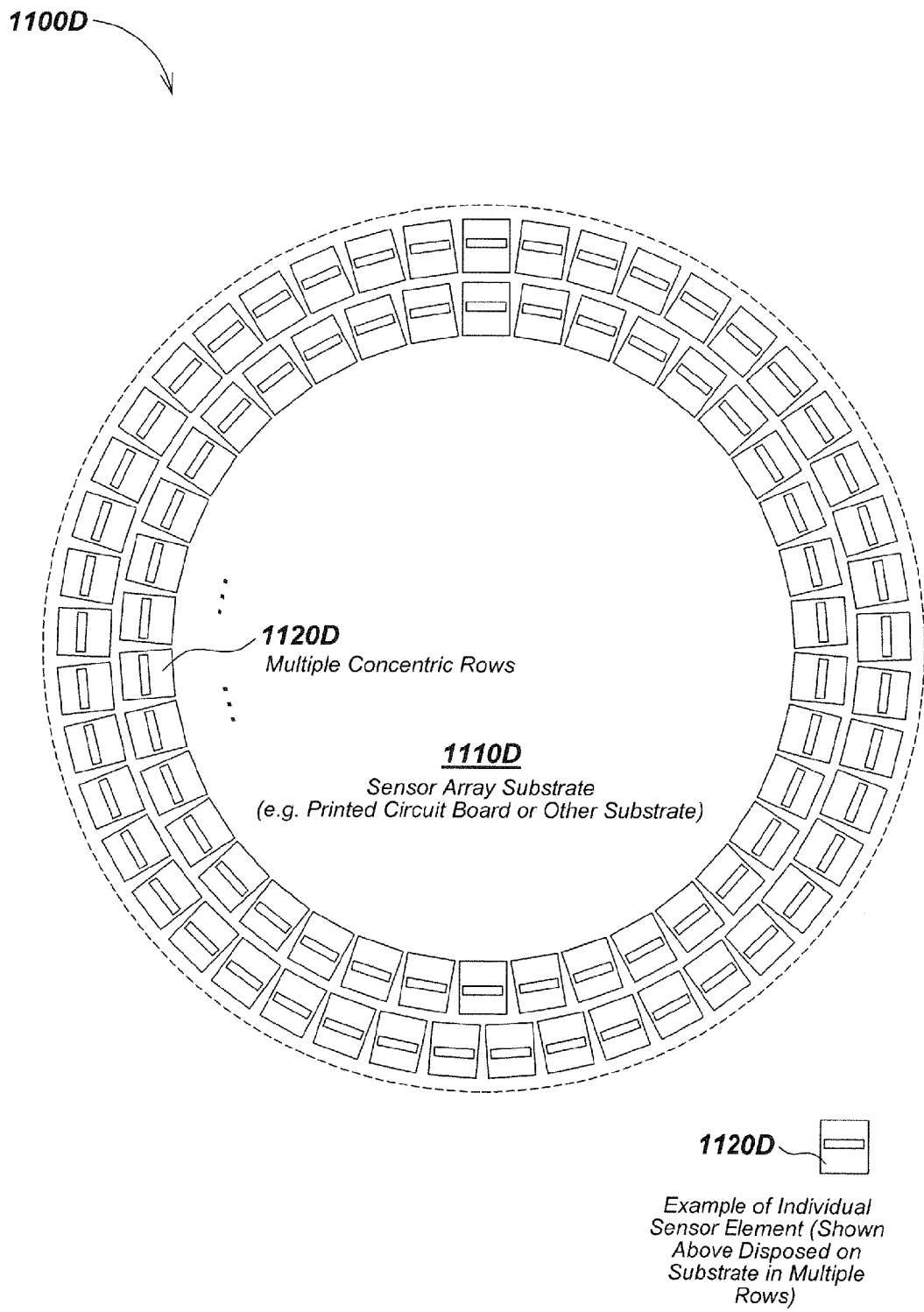

FIG. 11D illustrates yet another embodiment 1100D of a perimeter optical sensor array, in this case in a circular configuration similar to that of FIG. 11A while having additional rows of circumferentially arranged sensor elements 1120D. Sensor array 1100D may similarly include a substrate 1110D, such as a printed circuit board integrated circuit device, MEMS device, or other substrate element on which individual sensor elements 1120D may be disposed or integrated on or within in a circle such as shown. In an exemplary embodiment, individual sensor elements 1120D may be a sensor device such as Texas Advanced Optoelectronic Solutions (TAOS) sensor elements as described with respect to FIG. 15, or other optical sensor elements.

In the exemplary perimeter optical sensor array embodiment 1100D shown in FIG. 11D, multiple rows of the sensor elements are arranged concentrically around the substrate along the edges in a radial orientation as shown. However, other sensor arrangements, such as sensor oriented in the same X, Y direction, or in other arrangements, may alternately be used in some embodiments. Similar configurations having multiple rows of sensors may be implemented based on the square/rectangular or triangular configurations shown in FIGS. 11B and 11C, and/or in other shaped perimeter arrays. In addition, in some embodiments, additional interior sensor elements may be included, such as reference sensor elements at the center or other reference points or areas with the sensor array. Use of additional sensor elements may increase processing demand by requiring additional corrections, however, additional sensors may be able to provide further information for use in determining motion, location, and position data.

Figure 12:
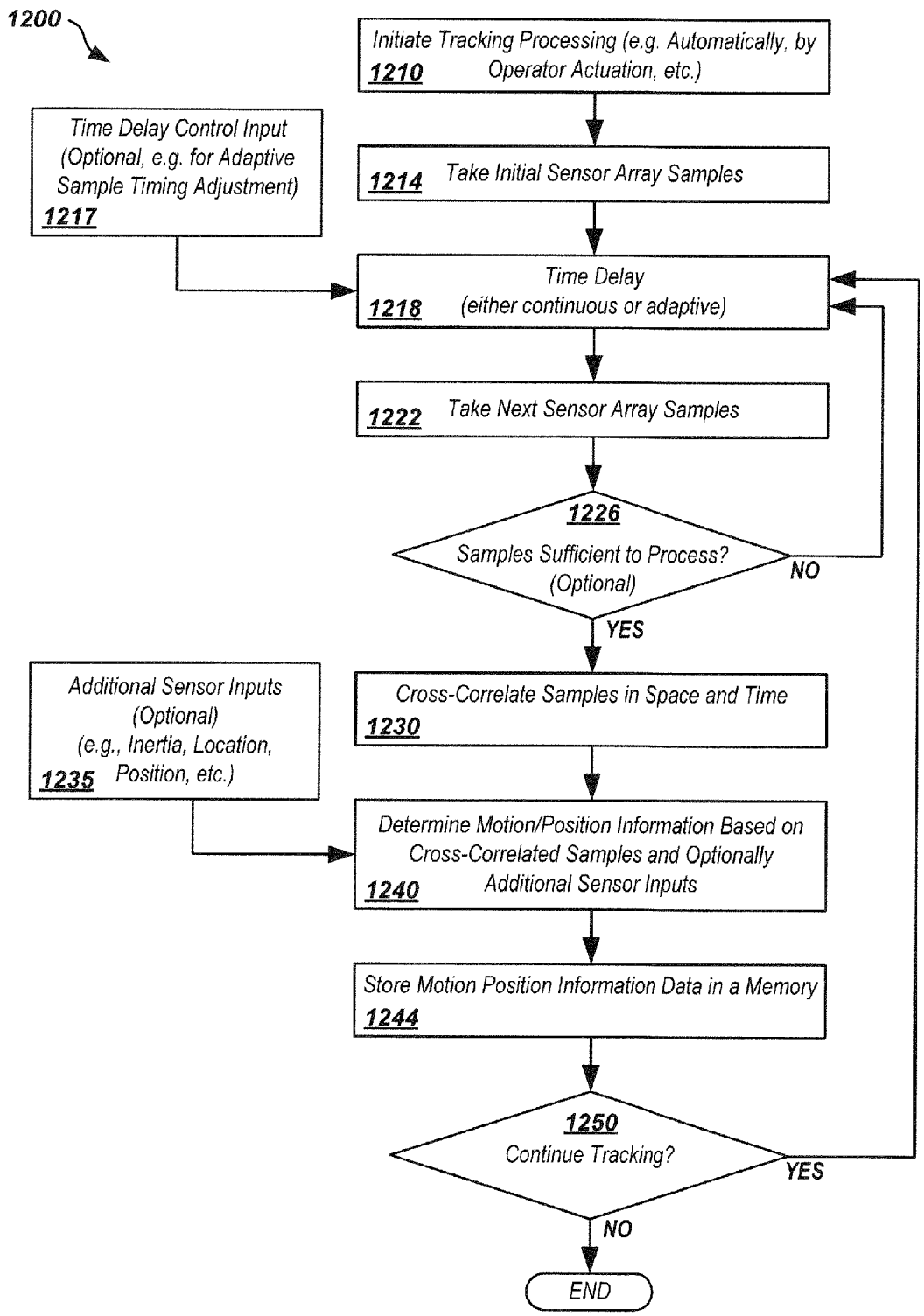
FIG. 12 illustrates details of one embodiment of a process in accordance with certain aspects for use in tracking movement of a locator or other device over the ground or other surfaces.

FIG. 12 illustrates details of an embodiment of a process 1200 for determining motion and/or position information in an optical ground tracking apparatus such as described herein. At stage 1210, the tracking process may be initiated, for example automatically based on locator or other device inputs, or by operator actuation, or continuously. Upon initiation, an initial sample of light values at a plurality of sensor elements of a perimeter optical sensing array, such as the arrays shown in FIGS. 11A-11D, may be taken at stage 1214. During operation, additional samples may be taken either periodically or at an adjustable rate, as described further below.

After a sample is taken, a time delay interval may be done at stage 1218. The time delay may be fixed or, in some implementations, variable, depending on other parameters such as device motion, ground characteristics, and the like. At stage 1222 another sample of sensor element values of the perimeter sensor array may be taken. After the additional sample is taken, a decision stage 1226 may optionally be implemented, wherein a decision may be made as to whether there are sufficient samples to process. If not, processing may return to stage 1218 where another delay may be done and stage 1222 where another sample may be taken.

At stage 1230, one or more sets of samples may be cross-correlated, such as in a processing element as described herein. For example, the previous sample may be cross-correlated, wherein values corresponding to each sensor element may be correlated with values of other sensor elements of the perimeter sensor array to determine a correlation result. Alternately, or in addition, samples from two or more sets of samples may be cross-correlated.

For example, for a single sample set, if the perimeter array has 10 sensor elements, the illumination and/or color values for sensor 1 may be cross-correlated with those of sensors 2 through 9 to generate a corresponding correlation matrix (along with cross-correlations between the other sensors as well). Further, when another sample is taken, the values for sensor 1 of the current sample may be correlated with the values of sensor 1 from previous samples, along with the values from other sensors from the previous sample, to generate a time and position cross-correlation matrix. This may then be used to determine relative motion of the ground tracking apparatus across the surface, such as by identifying when particular ground or surface features cross the perimeter of the perimeter sensor array based on correlation values.

In addition, motion, location, and/or position information 1235 may be further processed at stage 1240 by combining optically sensed values with values from other sensing elements such as inertial sensors such as accelerometers, compass sensors, GPS modules, wireless location modules, or other sensing elements or devices. At stage 1244, the determined motion, position, and/or location information may be stored in a memory, such as in a discrete memory or within a processing element.

In a typical operation, tracking will be repeated periodically, however, a decision stage 1250 may be included to determine whether to continue tracking and associated processing. If so, processing may be returned to stage 1218 or stage 1222 to collect further samples from the perimeter sensor array. Alternately, if tracking is to be stopped, either automatically or by user input, processing may be terminated after stage 1250.

In some implementations, sampling may be dynamically controlled, such as based on determined motion, ground characteristics, or other parameters. In this case, a time delay control input 1217, for implementing adaptive sample timing adjustment, may be provided to the time delay stage 1218 (and/or to other intermediate stages) to control relative timing between sample collection and/or correlation processing at stage 1230.

Figure 13:
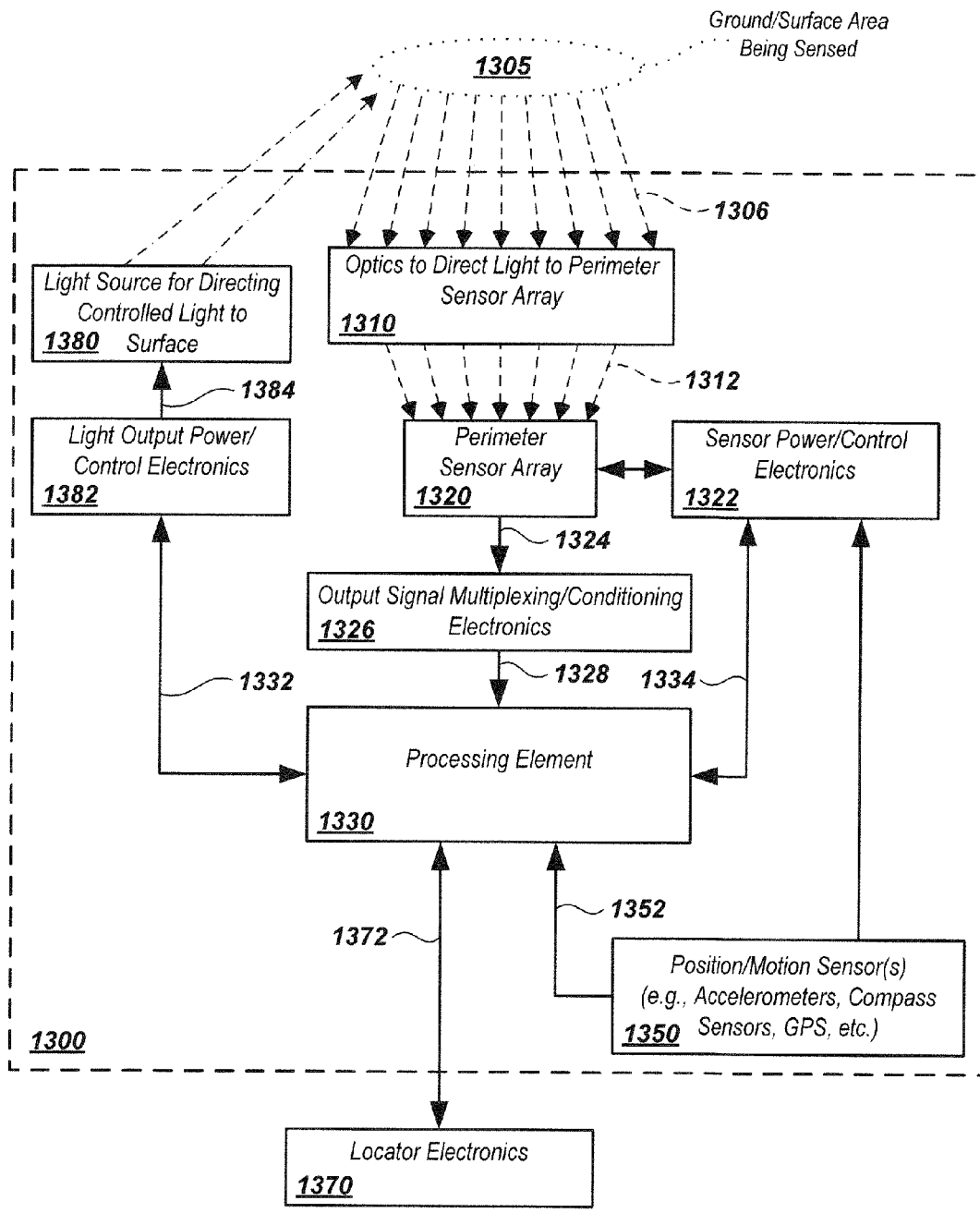
FIG. 13 illustrates a block diagram of details of an embodiment of a ground tracking apparatus in accordance with certain aspects.

FIG. 13 illustrates details of an embodiment 1300 of an optical ground tracking apparatus in accordance with certain aspects. In operation, ground tracking apparatus 1300 may be coupled to a buried object locator or other device, electrically and/or mechanically. For example, apparatus 1300 may be coupled electrically via connection 1372 to buried object locator electronics 1370 which may include various electronic modules to process electromagnetic signals received from buried or hidden objects and generate depth information and/or other position or location information, such as described in the incorporated applications.

A ground or other surface area 1305 may be sensed such as by directing light 1306 coming from the surface, either ambient, controlled output light from the ground tracking apparatus, or both, through optics 1310, which may be reflective and/or refractive optics, to further direct the light 1312 to a perimeter optical sensor array 1320. Perimeter optical sensor array 1320 may then sense the received light and generate a corresponding output signal, typically in the form of a digital output signal representing light characteristics at the perimeter sensor array optical elements such as brightness and/or color or wavelength range.

For example, a sample of light output may be converted to an output signal representing a plurality of optical element values for brightness and color at the individual optical elements disposed around the perimeter optical sensor. In some embodiments, the perimeter sensor array may be configured to automatically combine output values from multiple optical elements, whereas, in other embodiments an output signal multiplexing/conditioning electronics modules 1326 may receive signals from the multiple optical elements of the perimeter array and generate an output signal representing received light values for a particular sample time.

The multiplexed output signal from the perimeter sensor array may then be provided via connection 1328 to a processing element 1330, where it may then be processed as described herein, for example by cross-correlating sensor values within a particular sample time and/or cross-correlating sensor values across sample times.

In some embodiments, controlled illumination of the surface 1305 being sensed may be provided. The controlled illumination may be done in coordination with the sampling of received light at the perimeter sensor array 1320. For example, a light source 1380, such as a laser LED or other device, which may be combined with a diffraction grating or other mechanism, may direct controlled illumination to the target. As described previously herein, this may be in the form of lines or other shapes across the ground surface 1305. These may be further pulsed or otherwise cycled to facilitate detection and processing. A light output control electronics module 1382 may be used to control, via connection 1384 to the light source 1380 and connection 1332 to the processing element, output from the light source 1380. In some embodiments the light control functionality may be implemented entirely or substantially within the processing element, however, in other embodiments separate light control circuitry, such as circuit module 1382 as shown, may be used to control light output.

In addition, position and/or motion sensing elements, such as accelerometers, compass sensors, GPS or other devices, wireless-based position or location sensing devices, and the like may be used to provide additional motion, position, and/or location information to the processing element. For example, a motion sensing device may be used to generate motion information to be provided via connection 1352 to the processing element, which may then use this information to adjust parameters relates to the sensing being performed at the perimeter sensor array 1320. This may be directly by the processing element and/or in conjunction with additional circuitry such as a sensor power/control circuit module 1322 as shown, which may be coupled via connection 1334 to the processing element 1330. Similarly, one or more connections 1352 may be used to couple the position/motion sensors to the processing element 1330.

In one example configuration, motion and position data may be generated at sensor(s) 1350 and sent to processing element 1330, where they may be used to control the speed of sampling at the perimeter optical sensor. For example, if the motion information indicates that the ground tracking apparatus is moving relatively slowly across the ground, the sampling and associated correlation processing may be sped up so as to capture cross-correlations as the ground surface moves across the perimeter array sensor elements. Conversely, if the ground tracking apparatus is moving relatively fast across the ground, sampling may be decreased since the ground surface will be moving more slowly across the perimeter array sensor elements. Similar information may be used to determine changes in direction, speed, and the like and may be fed back to the processing element to adjust sampling and/or correlation processing accordingly. In addition, controlled light output, such as in the form of lines or other shapes, which may be pulsed, may be generated at light source 1380 and directed to the surface area, where sampling at the perimeter sensor array may be coordinated with the light output so as to determine parameters such as tilt of the apparatus or ground, relative height above the ground, and the like.

Figure 14:
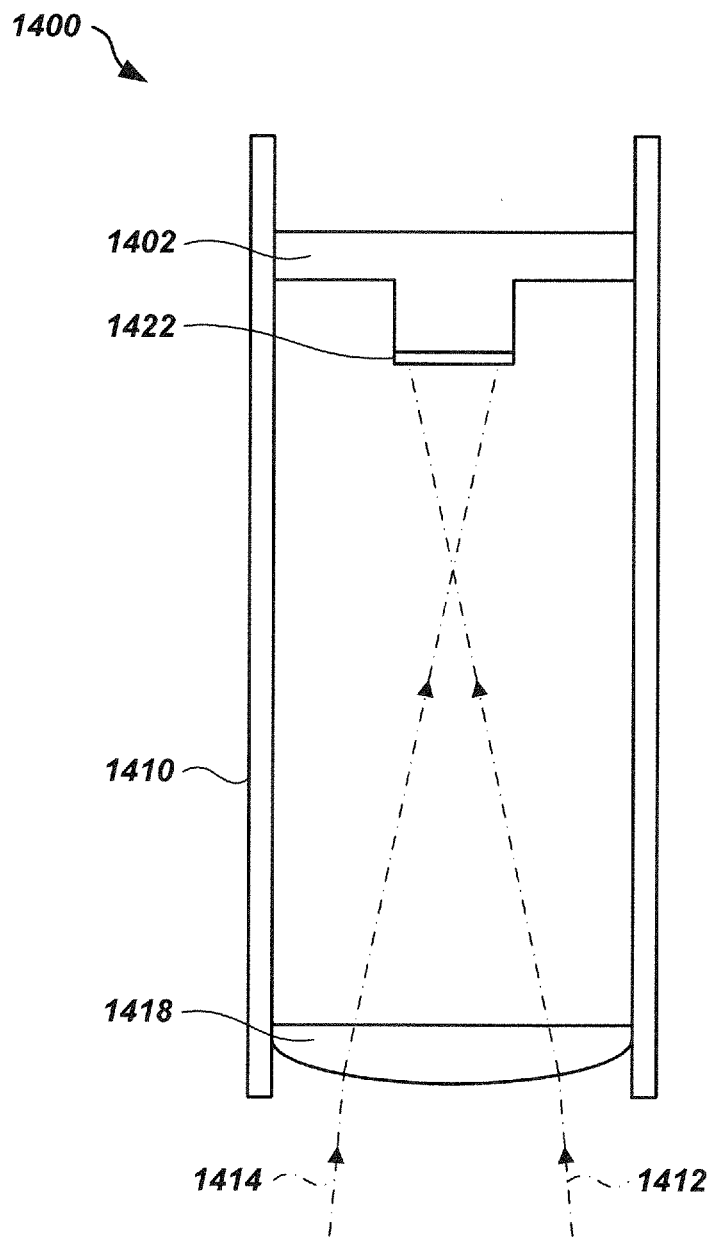
FIG. 14 illustrates details of another embodiment of an optical assembly in accordance with certain aspects for use in a ground tracking apparatus.

FIG. 14 illustrates details of an embodiment 1400 of an alternate optical assembly for providing light from the ground or another surface to a perimeter optical imaging sensor, such as sensor 1422 as shown. Optical assembly 1400 includes a housing assembly 1410 for mounting one or more refractive elements within, such as objective lens 1418 as shown. Other embodiments may use any of the variety of refractive lens elements and lens element configurations as are known or developed in the art to direct light using refraction to an imaging sensor. For example, rays 1414 and 1412 from the ground surface may be incident on lens 1418 as shown and may be bent as shown in lens element 1418 to generate a real image on the plane of the sensor 1422.

Sensor 1422 may be positioned on a mounting assembly within the housing, such as mounting bracket 1402 as shown, or on other mounting mechanism. Other elements (not shown in FIG. 14) may be included in embodiments of optical assemblies, such as focusing elements, panning or zooming elements, aperture control elements, tilt elements, and/or other mechanical or optical adjustment mechanisms.

In operation, incoming light from the ground or other surfaces (as illustrated by rays 1412 and 1414) enter optical assembly 1400 through objective lens 1418 and are directed to perimeter optical sensor array 1422 where they are then captured by ones of a plurality of optical sensor elements of optical sensor array 1422, with the sensor outputs then provided to a processing element (not shown) for correlation processing, similarly to the examples described previously herein with respect to reflective optical assemblies.

Figure 15:
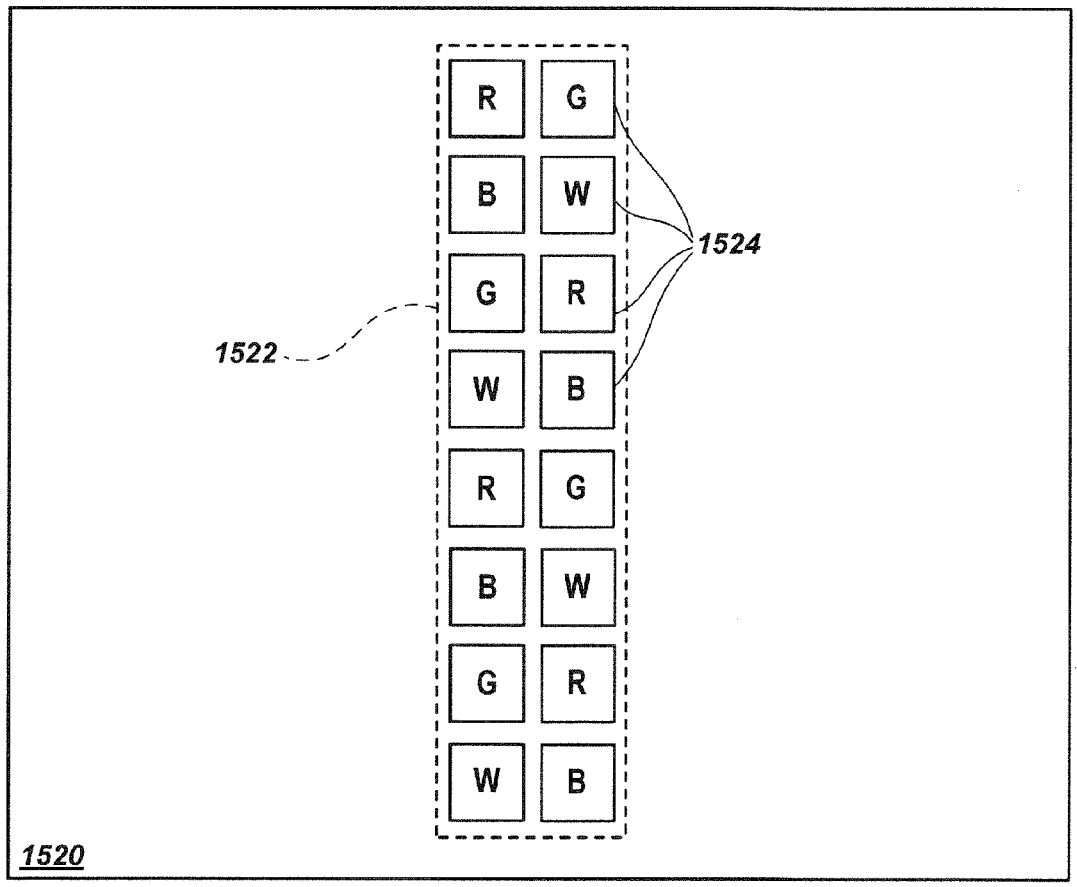
FIG. 15 illustrates details of one embodiment of an optical sensor element as may be used in various embodiments of perimeter optical sensor arrays in ground tracking apparatus.

FIG. 15 illustrates details of an exemplary optical sensor element 1520 as may be used in various embodiments of perimeter optical sensor arrays in ground tracking devices as described herein. Sensor element 1520 corresponds with a commercially available embodiment in the form of a Texas Advances Optoelectronic Solutions (TAOS) TCS 3304 or TCS 3414 digital color sensors as described in, for example, the TAOS197A-APRIL 2011 datasheet, the content of which is incorporated by reference herein.

In this device, multiple photodiodes with corresponding filters, analog-to-digital converters, and associated control electronics are incorporated to provide 16 bit resolution digital color chromaticity and illuminance (intensity) of received light. As shown in FIG. 15, each of the circuit blocks 1524 of the sensor element 1520 include a photodiode, filter (denoted as R for red, G for green, B for blue, and W for clear or no filter). These photodiodes are configured in a multi-color sensing array 1522 to combine outputs from the various photodiodes to generate the 16 bit output data. In addition, the sensing element can be synchronized with an external light source, such as a laser LED or other light source, to support the controlled illumination functionality described herein. It is noted that while TAOS sensor elements may be used in one exemplary embodiment, various other integrated or distributed sensor devices having monochrome and/or color light sensing functionality, in either infra-red, visible light, or ultraviolet wavelengths may be used in alternate embodiments.

In some configurations, the apparatus, circuit, modules, or systems described herein may include means for implementing features or providing functions described herein. In one aspect, the aforementioned means may be a module comprising a processing element including a processor or processors, associated memory and/or other electronics in which embodiments of the invention reside, such as to implement signal processing, switching, transmission, or other functions to process and/or condition transmitter outputs, locator inputs, and/or provide other electronic functions described herein. These may be, for example, modules or apparatus residing in buried object transmitters, locators, coupling apparatus, and/or other related equipment or devices.

In one or more exemplary embodiments, the electronic functions, methods and processes described herein and associated with sensors and locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosures herein. Thus, the presently claimed invention is not intended to be limited to the aspects shown herein, but is to be accorded the widest scope consistent with the appended Claims and their equivalents.

We claim:

1. A buried object locator carried and controlled by a user over a ground to detect objects buried below the ground, the buried object locator comprising:
   a magnetic field sensing buried object locator module to detect a buried object based upon sensing magnetic fields emitted by the buried object, and generate buried object information corresponding to the detected buried object;
   a surface tracking module to:
   detect light reflected from a tracking surface;
   sense or compute a user-effected motion of the buried object locator over the ground relative to the tracking surface, based at least in part on analysis of light patterns associated with the tracking surface; and
   generate motion information corresponding with the sensed or computed user-effected motion; and
   an integration module configured to associate the buried object information with corresponding motion information and store the associated information in a memory.

2. The buried object locator of claim 1, further comprising a light detection and ranging (LIDAR) apparatus to measure a height of the locator and/or distance of a reference point of the locator from the ground and provide a corresponding LIDAR output signal to the surface tracking module, wherein the motion information is further based on the LIDAR output signal.

3. The buried object locator of claim 2, wherein the LIDAR apparatus measure the distance of the reference point of the locator from the ground, and wherein the reference point is a position of a magnetic field sensing antenna array of the locator.

4. The buried object locator of claim 1, further comprising an upward facing camera positioned on or within the locator in an upward facing direction when the locator is vertically oriented in normal use.

5. The buried object locator of claim 4, wherein the upward facing camera is coupled to a processing element to receive images from the camera of the sky and track or determine a position of the sun based at least in part on the received images.

6. The buried object locator of claim 5, wherein the upward facing camera is programmed to capture images or a video stream of a user and store the images or video stream in a memory.

7. The buried object locator of claim 1, further comprising a laser range finder apparatus to measure a height of the locator and/or a distance of a reference point of the locator from the ground.

8. The buried object locator of claim 7, wherein the laser range finder apparatus measures the distance of the reference point of the locator from the ground, and wherein the reference point is a position of a magnetic field sensing antenna array of the locator.

9. The buried object locator of claim 1, further comprising a laser Doppler apparatus.

10. The buried object locator of claim 9, wherein the laser Doppler apparatus generates information for use in determining a motion of the locator over the ground.

11. The buried object locator of claim 10, wherein the motion includes a speed and/or a direction of movement of the locator over the ground.

* * * * *